United States Patent
Oshinsky et al.

(10) Patent No.: US 8,331,960 B1
(45) Date of Patent: *Dec. 11, 2012

(54) SYSTEMS AND METHODS FOR COMMUNICATING WITH A PAGING NETWORK OPERATIONS CENTER THROUGH WIRELESS CELLULAR DEVICES

(75) Inventors: Stephen Oshinsky, Madison, MS (US); Ed Meyercord, Princeton, NJ (US); Ted McNaught, Windham, ME (US)

(73) Assignee: Critical Alert Systems LLC, Westbrook, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,077

(22) Filed: Jun. 8, 2011

(51) Int. Cl.
  *H04W 68/00* (2009.01)
  *H04B 1/38* (2006.01)

(52) U.S. Cl. ........................................ 455/458; 455/567

(58) Field of Classification Search .................. 455/424, 455/425, 426.1, 458, 466, 567, 515
  See application file for complete search history.

(56) References Cited

U.S. PATENT DOCUMENTS

| | | | |
|---|---|---|---|
| H610 H | 3/1989 | Focarile et al. |
| 4,940,963 A | 7/1990 | Gutman et al. |
| RE33,417 E | 10/1990 | Bhagat et al. |
| 5,109,400 A | 4/1992 | Patsiokas et al. |
| 5,117,449 A | 5/1992 | Metroka et al. |
| 5,148,473 A | 9/1992 | Freeland et al. |
| 5,153,903 A | 10/1992 | Eastmond et al. |
| 5,175,758 A | 12/1992 | Levanto et al. |
| 5,225,826 A | 7/1993 | DeLuca et al. |
| 5,247,700 A | 9/1993 | Wohl et al. |
| 5,392,452 A | 2/1995 | Davis |
| 5,414,750 A | 5/1995 | Bhagat et al. |
| 5,497,339 A | 3/1996 | Bernard |
| 5,513,241 A | 4/1996 | Dimitriadis et al. |
| 5,526,398 A | 6/1996 | Okada et al. |
| 5,541,976 A | 7/1996 | Ghisler |

(Continued)

FOREIGN PATENT DOCUMENTS

DE  19721127  12/1997

(Continued)

OTHER PUBLICATIONS

Donovon, Synapse Pager Card, Northcon/98 Conference Proceedings 1998, pp. 98-103.

(Continued)

*Primary Examiner* — Kent Chang
*Assistant Examiner* — Nelson Rosario
(74) *Attorney, Agent, or Firm* — Bryan Cave LLP

(57) ABSTRACT

Systems, methods, and media are provided for facilitating bidirectional communication between a wireless device, such as cellular device, and a paging operator's network operations center (NOC). Messages from the paging NOC are received over a paging network through paging circuitry included in the wireless device. Certain embodiments are directed to systems and methods for transmitting status messages or response messages pertaining to the received messages from the wireless device to the paging NOC through an alternate network, such as a cellular network or the Internet. Other embodiments are directed to systems and methods for displaying the received messages, and for determining and displaying user response actions, based on data included in the messages and/or stored on the wireless device. These systems and methods take advantage of the benefits provided by paging and wireless devices in order to maximize the reliability and minimize the delay associated with the messaging system.

36 Claims, 9 Drawing Sheets

U.S. PATENT DOCUMENTS

| | | | |
|---|---|---|---|
| 5,559,862 | A | 9/1996 | Bhagat et al. |
| 5,638,450 | A | 6/1997 | Robson |
| 5,675,524 | A | 10/1997 | Bernard |
| 5,701,337 | A | 12/1997 | Silver et al. |
| 5,729,590 | A | 3/1998 | Dimitriadis et al. |
| 5,737,707 | A | 4/1998 | Gaulke et al. |
| 5,802,470 | A | 9/1998 | Gaulke et al. |
| 5,828,949 | A | 10/1998 | Silver et al. |
| 5,854,984 | A | 12/1998 | Buhrmann et al. |
| 5,884,188 | A | 3/1999 | Hayes, Jr. |
| 5,898,758 | A | 4/1999 | Rosenberg |
| 5,950,128 | A | 9/1999 | Ghisler |
| 5,973,613 | A | 10/1999 | Reis et al. |
| 6,002,945 | A | 12/1999 | McDuffee |
| 6,009,309 | A | 12/1999 | Okada et al. |
| 6,134,436 | A | 10/2000 | Ezaki |
| 6,188,907 | B1 | 2/2001 | Reding et al. |
| 6,259,892 | B1 * | 7/2001 | Helferich ............... 340/7.2 |
| 6,329,902 | B1 | 12/2001 | Lee et al. |
| 6,377,798 | B1 | 4/2002 | Shaffer et al. |
| 6,434,395 | B1 | 8/2002 | Lubin et al. |
| 6,522,879 | B2 | 2/2003 | Myer et al. |
| 6,542,721 | B2 | 4/2003 | Boesen |
| 6,653,816 | B2 | 11/2003 | Peek et al. |
| 6,757,551 | B2 | 6/2004 | Newman et al. |
| 6,760,600 | B2 | 7/2004 | Nickum |
| 6,934,560 | B2 | 8/2005 | Chuang |
| 7,062,281 | B2 * | 6/2006 | Blink et al. ............... 455/458 |
| 7,352,998 | B2 * | 4/2008 | Palin et al. ............... 455/41.2 |
| 8,107,601 | B2 * | 1/2012 | Helferich ............... 379/88.22 |
| 2004/0104808 | A1 | 6/2004 | Khoshbin |
| 2011/0096706 | A1 | 4/2011 | Ramasamy et al. |

FOREIGN PATENT DOCUMENTS

| | | |
|---|---|---|
| EP | 0503813 | 9/1992 |
| EP | 0720397 | 7/1996 |
| EP | 1387593 | 2/2004 |
| GB | 2269072 | 1/1994 |
| GB | 2366149 | 2/2002 |
| GB | 2421659 | 6/2006 |
| WO | WO 92/04797 | 3/1992 |
| WO | WO 94/13070 | 6/1994 |
| WO | WO 95/26113 | 9/1995 |
| WO | WO 97/03534 | 1/1997 |
| WO | WO 98/21898 | 5/1998 |
| WO | WO 01/89246 | 11/2001 |
| WO | WO 2008/118878 | 10/2008 |
| WO | WO 2011/050195 | 4/2011 |

OTHER PUBLICATIONS

Eisenberg, Message From the Wilderness, via Satellite, The New York Times [online], Jan. 29, 2011 [retrieved on Jan. 31, 2011]. Retrieved from the Internet: <URL: http://www.nytimes.com/2011/01/30/business/30novel.html?r=1.

Apple acquires paging patent to assist enterprise and medical complexes [online], May 2, 2011 [retrieved on Jan. 31, 2011]. Retrieved from the Internet: <URL: http://macdailynews.com/2011/05/02/apple-acquires-paging-patent-to-assist-enterprise-and-medical-complexes/?utm_source=feedburner&utm_medium=feed&utm_campaign=Feed%3A+wordpress%2FxhfA+%28MacDailyNews%29.

Sprint's ZTE Peel Case Turns Your iPod Touch Into a Cheap, Contract-Free iPhone [online], Nov. 10, 2010 [retrieved on Jan. 31, 2011]. Retrieved from the Internet: <URL: http://www.popsci.com/gadgets/article/2010-11/sprints-zte-peel-case-turns-your-ipod-touch-cheap-contract-free-iphone.

2011 CES Unveiled: pipSqueak [online], Jan. 5, 2011 [retrieved on Jan. 31, 2011]. Retrieved from the Internet: <URL: http://www.displayblog.com/2011/01/05/2011-ces-unveiled-pipsqueak/.

pipSqueak!—Cell Phone Management Jewelry [online], Jan. 5, 2011 [retrieved on Jan. 31, 2011]. Retrieved from the Internet: <URL: http://blog.etcenter.org/2011/01/pipsqueak-cell-phone-management-jewelry/.

Welcome to the seekerpnd.com [online], 2010-2011 [retrieved on Jan. 31, 2011]. Retrieved from the Internet: <URL: http://www.seekerpnd.com/.

Notification of Transmittal of the International Search Report and the Written Opinion of the International Searching Authority, or the Declaration, including the International Search Report, and Written Opinion of the International Searching Authority, mailed Apr. 3, 2012.

Invitation to Pay Additional Fees and, Where Applicabale, Protest Fee, and Communication Relating to the results of the Partial International Search (PCT/ISA/206), mailed May 21, 2012.

Notification of Transmittal of the International Search Report and the Written Opinion of the International Searching Authority, or the Declaration, including the International Search Report, and Written Opinion of the International Searching Authority, mailed Aug. 21, 2012.

* cited by examiner

SYSTEMS AND METHODS FOR COMMUNICATING WITH A PAGING NETWORK OPERATIONS CENTER THROUGH WIRELESS CELLULAR DEVICES

FIELD OF THE INVENTION

The present invention generally relates to systems and methods for facilitating bidirectional communication between wireless devices, such as cellular devices, and a paging operator's network operations center (NOC). More specifically, certain embodiments are directed to systems and methods for displaying and responding to messages received over a paging network at a wireless cellular device having embedded paging circuitry, and for transmitting status messages back to the paging NOC through a secondary network, such as a cellular network or the Internet.

BACKGROUND OF THE INVENTION

Both pagers and wireless devices, such as cellular telephones, are widely used forms of communication. Although a few two-way paging systems have been developed, paging systems are typically one-way radio communications systems. In order to send a message to a user who has a paging device, the sender contacts a paging NOC, usually via a telephone or computer network. Upon accessing the paging NOC, the sender can perform certain operations, including inputting a call-back number or message to be sent to the paging device or leaving a voice message for the user of the paging device. The paging NOC can then deliver the call-back number, message or the voice message to the paging device through a paging network using standard Over-The-Air protocols, such as POCSAG or FLEX.

Wireless cellular devices, on the other hand, typically communicate through bidirectional communication systems. Most of these devices allow for real-time bidirectional communication. For example, when an individual wishes to contact a user who has a cellular telephone, the individual usually dials the number associated with the cellular telephone from the individual's cellular or landline telephone. Once a connection is established between the two telephones, voice and other data are transmitted to and from the cellular telephone through a cellular network, using standard cellular protocols such as GSM or CDMA.

The transmitters used in paging systems typically operate at a higher power level than the transceivers used in cellular systems. Accordingly, the coverage area associated with individual transmission towers in paging systems is often greater than the coverage area associated with individual transmission and reception towers in cellular systems. For similar reasons, paging systems also tend to provide greater penetration than cellular telephone systems. Moreover, unlike cellular systems, paging systems have the ability to simulcast transmissions by utilizing constructive interference to strengthen the signal, which further increases the coverage area and penetration of the paging signals. As a result of these differences, paging service is frequently available in certain geographic areas and environments where cellular telephone service is not available.

In addition, due to their configuration, paging systems typically allow for multicasting of paging communications to multiple devices. Thus, a paging system can broadcast information to a large number of users simultaneously. Conversely, cellular telephone systems typically only allow for messages to be transmitted sequentially (i.e., to a single cellular device at a time), and cannot broadcast messages to a specific group of users simultaneously. Paging systems, therefore, generally provide increased reliability with respect to the delivery and receipt of communications as compared to cellular telephone systems.

The need to subscribe to a paging service (in addition to a cellular service) is important for many users, such as those who work in certain time-sensitive professions. This is primarily due to the higher degree of reliability and timeliness provided by paging systems. This is especially true for people working in certain fields, such as medical personnel and emergency workers, who are often required to carry a paging device in addition to their cellular telephone. In these, and other, professions, messages need to be received as reliably and as quickly as possible. For example, in hospitals, minutes and even seconds often make the difference between life and death. The ability to deliver messages to doctors and other medical personnel quickly and reliably decreases the response time for medical emergencies. In turn, this can often decrease negative impacts to patient health associated with the time taken to respond to the medical emergency. Similarly, many emergency workers need to receive messages reliably and with minimal delay in order to respond and react effectively to various emergency situations. Frequently, these emergencies involve life-threatening situations, in which rapid response time is vital. As a result, in these professions, even small increases in the reliability, or decreases in the delay, of message delivery and receipt can significantly impact the number of lives benefitted or saved.

Additionally, there has been a substantial rise over the last two decades in terrorist attacks and "active shooter" events. A common problem associated with these events is a lack of ability to immediately transmit mass notification messages to individuals in the threat area. Without the ability to broadcast messages, there is no practical way to provide potential victims with status notifications in real-time. Also, these events are often widespread and can involve a large number of emergency or response personnel. As a result, another common problem has been the lack of ability to simultaneously provide status notifications and instructions to update and coordinate such personnel in real-time. These issues have further emphasized the potential benefits to subscribing to both paging and cellular services.

In order to subscribe to both paging and cellular services, however, consumers typically have to carry, monitor and maintain two separate devices. This leads to a number of inconveniences with respect to the portability, cost and ease of use of these devices. While systems have been developed that provide an aggregated pager and cellular telephone (e.g., U.S. Pat. No. 5,117,449), these systems have merely attached the two devices together, or combined the devices within a single housing, in an apparent attempt to address the problem of owning and carrying separate devices. In these systems, the pager and cellular telephone typically operate as separate devices or components within the aggregate device. As a result, these aggregate devices have exhibited a number of drawbacks and limitations, which have resulted in their failure to be adopted by consumers in any meaningful way.

For example, one drawback to these aggregate devices is that they do not provide for status messages, such as acknowledgements, and responses to be sent back to the paging NOC that delivered the paging message. Another drawback is that these devices do not provide for the delivery of paging messages through an alternate path, such as a cellular network or the Internet, in the unusual circumstances where paging network service is weak or unavailable. These functionalities are crucial to many paging users, such as those working in time-sensitive and/or emergency situations, because they allow for a more efficient, reliable and timely messaging system. Accordingly, there is a need for an integrated pager and wireless device that addresses these drawbacks and, in turn, maximizes the reliability and minimizes the delay of the messaging system.

Other systems have been developed in which a pager, that is connected to or combined with a cellular telephone, is used to "wake-up," or initiate a call with, the cellular telephone (e.g., U.S. Pat. No. 5,701,337). The purpose of these systems, however, is to conserve the battery life of the cellular device by allowing the cellular device to go into sleep mode or power down and then be "woken-up" by the pager prior to an incoming telephone call, rather than to allow for both cellular and paging functionality in a single device. As a result, these systems do not provide users with paging service in addition to cellular telephone service. Accordingly, these systems do not allow users to receive and view paging messages on the user's cellular telephone or wireless device.

More recently, systems have also been created which have attempted to use cellular networks in order to mimic the services offered by paging systems (e.g., PageCopy by American Messaging; and MessageSync by Indiana Paging). These systems provide users with an application that can be installed on their cellular telephone or other wireless device that receives and displays certain messages on the device. These systems, however, do not utilize a paging network and, as such, do not provide a user with true paging services. Instead, these systems merely use the cellular capabilities of the user's device to deliver messages to the device through a cellular network thereby mimicking a paging message. As a result, these systems do not provide users with the advantages associated with true paging network services, such as greater coverage areas, penetration, timeliness, and reliability, as well as the ability to receive multi-casted messages.

Thus, there is a need for a system which combines the features and advantages of wireless devices, paging devices and their associated networks into a single device, while maximizing the reliability and minimizing the delay of delivering messages to users. There is also a need for a system which can display paging messages based on the priority of the messages. There is further a need for a system which can generate and display possible response actions based on the received messages and/or data stored on the device. There is still further a need for the ability to broadcast emergency messages to a large number of users simultaneously. In light of the beneficial qualities of paging systems, such as greater coverage areas, penetration and timeliness, as well as multi-casting, it would be desirable to provide a system which allows users to receive, view, and respond to messages received through a paging network on wireless devices, such as cellular telephones, and which provides status messages back to the paging NOC, including status messages that indicate successful delivery, receipt, and/or acknowledgement of the received paging messages.

SUMMARY OF THE INVENTION

One aspect of the invention is to deliver paging messages to users of other devices in a manner that maximizes the reliability and minimizes the delay associated with the delivery and receipt of such messages. Another aspect of the invention is to provide a cellular or other wireless device that allows users to receive messages over a paging network and to view and respond to such messages without the need for a separate paging device. Yet another aspect of the invention is to provide such a device that is capable of bidirectional communication with a paging NOC. Yet another aspect of the invention is provide such a device that allows for the transmission of status messages pertaining to the received paging messages and the status of the connection to the paging network, as well as response messages back to the paging NOC through a secondary network such as a cellular network or the Internet. Yet another aspect of the invention is to provide such a device that displays received paging messages based on their priorities. Yet another aspect of the invention is to provide such a device that can determine a number of user response actions based on data included in the received paging messages, and/or data stored on the device, and display the response actions to the user. Yet another aspect of the invention is to provide a system in which emergency messages can be broadcasted reliably and simultaneously to a large group of users.

The above and other aspects may be realized through systems and methods for communicating with a paging NOC through a wireless device. In certain embodiments, systems and methods are provided for receiving messages from a paging NOC at a cellular or other wireless device through a radio connection established between the wireless device and a paging network. The wireless device includes an application processor, display circuitry and paging circuitry. The paging circuitry includes a paging baseband processor and a paging RF receiver. In certain embodiments, the paging RF receiver may be a separate receiver. In other embodiments, the paging RF receiver may be incorporated within an existing receiver or transceiver of the wireless device. The paging RF receiver establishes a radio connection with the paging network. In response to receiving a message from the paging network, the paging RF receiver transfers the received message to the application processor and the application processor causes the display circuitry to display the message.

In certain embodiments, the wireless device may be any device capable of receiving and transmitting messages over a cellular network, such as a cellular telephone, smartphone, PDA, or tablet. In accordance with certain of these embodiments, the wireless device includes a cellular baseband processor and a cellular RF transceiver which establishes a radio connection with a cellular network. In accordance with certain of these embodiments, the paging RF receiver is included within a receiver portion of the cellular RF transceiver. In accordance with certain of these embodiments, the cellular baseband processor and the application processor comprise a single processor.

In certain embodiments, the wireless device may be any device capable of establishing a connection with a second network, other than the paging network, such as Wi-Fi, WiMAX, the Internet or a dedicated network. In certain of these embodiments, the wireless device includes an RF transceiver which establishes a radio connection to the Internet. In certain other embodiments, the wireless device includes circuitry for establishing a wired connection to the Internet.

In accordance with certain of these embodiments, status messages, such as acknowledgements that a paging message has been successfully received or read, error messages and/or messages indicating the status of the connection between the wireless device and the paging network, can be transmitted from the wireless device to the paging NOC. In accordance with certain of these embodiments, the status messages are transmitted to the paging NOC through a cellular network and a connection between the cellular network and the paging NOC. In other embodiments, the status messages are transmitted to the paging NOC through a direct network connection between the wireless device and the paging NOC, such as an Internet connection.

In certain embodiments, in response to transmitting a status message to the paging NOC that the paging network is unavailable, the wireless device can receive retransmitted paging messages from the paging NOC through an alternate network. In accordance with certain of these embodiments, the wireless device receives the retransmitted paging messages through a cellular network. In other embodiments, the wireless device receives the retransmitted paging messages through a direct network connection between the paging NOC and the wireless device, such as an Internet connection.

In certain embodiments, the paging messages received by the wireless device from the paging NOC may include a message priority attribute. The message priority attributes indicate a priority level or priority group for the received messages. The application processor of the wireless device can cause the display circuitry to display the message based, in part, on the message priority attribute.

In accordance with certain of these embodiments, the application processor determines whether a process executing on the wireless device, such as an application, should be interrupted to display the received message based, based at least in part, on the message priority attribute. In accordance with certain of these embodiments, the application processor interrupts the executing process in response to determining that a priority associated with the executing process is lower than the priority of the received message. In certain embodiments, the priorities of applications and processes on the wireless device are customizable by a user of the wireless device.

In certain embodiments, the application processor determines the manner in which to display the received paging message based, at least in part, on the message priority attribute included with the message. In accordance with certain of these embodiments, the application processor may determine a color scheme for displaying the message. In accordance with certain of these embodiments these color schemes are customizable by a user, or based on the type of user, of the wireless device.

In certain embodiments, the application processor determines a plurality of user response actions based, in part, on the received paging message. In accordance with certain of these embodiments, one or more of the user response actions are determined based on responses included with the received paging message. In accordance with certain of these embodiments, one or more of the user response actions are determined based on responses stored in the wireless devices. In accordance with certain of these embodiments, the user response actions include the ability to receive a custom response message through a user interface of the wireless device.

In certain embodiments, the application processor determines one or more searchable items based on the received paging message. The application processor compares the searchable items to data stored in the wireless device, such as contact lists, and, in response to detecting a match, the application processor can determine one or more user response actions.

In certain embodiments, the application processor determines a selectable response list based on the user response actions. The application processor causes the display circuitry to display the selectable response list. In accordance with certain of these embodiments, the application processor can receive a notification through a user interface that one of the response actions has been selected. In accordance with certain of these embodiments, a response message can be transmitted from the wireless device to the paging NOC through the cellular network and a connection between the cellular network and the paging NOC, or through a direct network connection with the paging NOC, such as an Internet connection.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which:

FIG. 8 is a flow diagram of yet another process that may be used by the wireless device in accordance with certain embodiments;

DETAILED DESCRIPTION OF THE INVENTION

As discussed above, pagers and wireless devices such as cellular telephones have typically been separate devices which operate independently. To reduce the inconvenience of having to own, manage and monitor two separate devices, a wireless device is provided having paging circuitry such that the wireless device can communicate with a paging operator's network operations center (NOC) through a radio connection established between the wireless device and the paging NOC through a paging network. Certain embodiments allow the wireless device to receive paging messages from the paging NOC through the radio connection established over the paging network and to display received paging messages at the wireless device. Certain embodiments allow information, such as status messages and response messages, to be transmitted back to the paging NOC through a second network, such as a cellular network or the Internet. Certain other embodiments allow the wireless device to display the received paging messages based on a message priority attribute pertaining to the messages. Yet other embodiments allow for a plurality of user response actions to be determined based on the received paging messages and data stored on the wireless device. The wireless device displays a selectable response menu based on the plurality of user response actions. As used herein, the term "message" means a communication comprising one or more alphanumeric characters intended to be displayed to the recipient. The term "display,"

as used herein, means a visual, audible, or tactile display or any combination thereof. The systems and methods described below take advantage of the benefits provided by both paging devices and wireless devices in order to maximize the level of reliability with respect to the delivery and receipt of paging messages sent to users.

Figure 1:
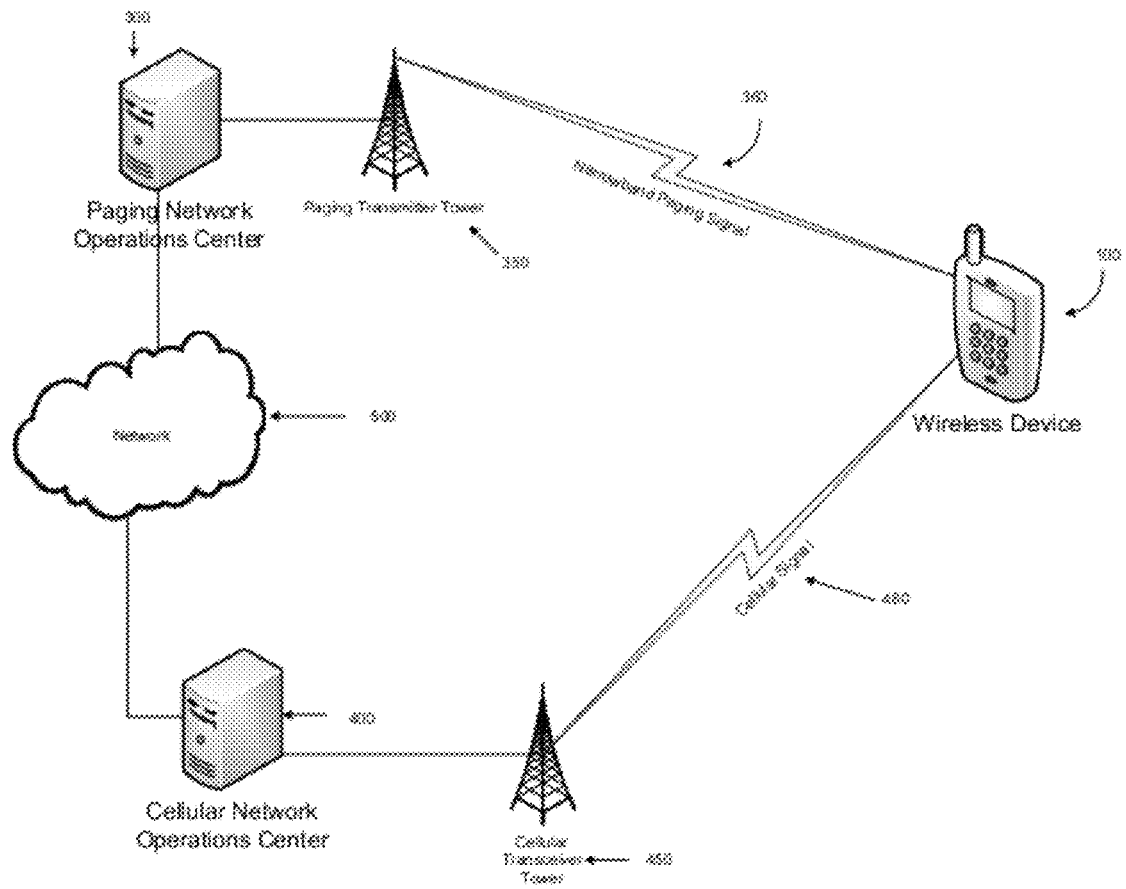
FIG. 1 is a block diagram illustrating the interactions between various components, including the wireless device and the paging NOC, according to certain embodiments.

FIG. 1 is a pictorial diagram of a paging and cellular system in accordance with certain embodiments. The system includes Paging NOC 300 which coordinates and manages the delivery of paging messages. Paging NOC 300 utilizes a paging network including paging transmitter tower 350 to transmit messages to paging devices through narrowband paging signal 360. Narrowband paging signal 360 may be transmitted in accordance with any standard paging protocol such as FLEX, POCSAG, or any other suitable protocol. Also shown in FIG. 1 is Cellular NOC 400 which coordinates and manages the communications to and from cellular devices. Cellular NOC 400 utilizes a cellular network including cellular transceiver tower 450 to transmit and receive voice and data to and from wireless devices such as cellular devices through cellular signal 460. Cellular signal 460 may be transmitted in accordance with any a standard cellular protocol such as GSM, CDMA, PHS, or any other suitable protocol. As shown in FIG. 1, Paging NOC 300 and Cellular NOC 400 communicate with each other through network 500. Network 500 can be a local area network, VPN connection, the Internet, or any other suitable connection. It will be appreciated that Paging NOC 300 and Cellular NOC 400 may utilize a plurality of paging transmitter towers and cellular transceiver towers, respectively, although only one of each is shown for illustration purposes. The transmission of paging signals from Paging NOCs to paging devices and the transmission of cellular signals from Cellular NOCs to cellular and other wireless devices is well known in the art.

Also shown in FIG. 1 is an example of a wireless device 100. Wireless device 100 receives paging messages sent by Paging NOC 300 through paging transmitter tower 350 using narrowband paging signal 360. In certain embodiments, wireless device 100 also receives various attributes associated with the received messages, such as a message priority attribute or one or more predefined responses, from paging NOC 300. In certain of these embodiments, as discussed in the description that follows, wireless device 100 can use these attributes to determine when and how to display the received messages. In certain embodiments, wireless device 100 can use these attributes, as well as the received messages themselves, to determine user response actions for the received messages.

In certain embodiments, such as is illustrated in FIG. 1, wireless device 100 can be a cellular telephone or any other PDA, tablet, smartphone, or handheld device equipped with some or all of the circuitry shown in any of FIGS. 2-5 and capable of wireless communication as discussed in the description that follows. Wireless device 100 receives cellular signals 460 from, and transmits cellular signals to (e.g., signals sent and received over mobile carrier networks), Cellular NOC 400 through cellular transceiver tower 450. In certain of these embodiments, wireless device 100 can communicate with Paging NOC 300 through Cellular NOC 400 and network 500. Accordingly, wireless device 100 can transmit various status messages, such as acknowledgements that the message has been received successfully or read, notifications of the status of the connection to the paging network, and error notifications, as well as response messages, to Paging NOC 300 through cellular NOC 400 and network 500. In certain of these embodiments, such as where the status message is an error notification or a notification indicating that the wireless device is unable to establish a connection to the paging network, wireless device 100 can receive retransmitted paging messages from Paging NOC 300 over the cellular network through network 500 and cellular NOC 400.

In certain embodiments, as is also illustrated in FIG. 1, wireless device 100 can communicate with Paging NOC 300 through a direct connection to network 500, such as a WiFi connection (without going through Cellular NOC 400). In yet other embodiments, wireless device 100 can communicate with Paging NOC 300 through a dedicated network or any other suitable network connection. In certain of these embodiments, wireless device 100 can transmit the status and response messages to Paging NOC 300, such as through the direct connection to network 500 or a dedicated network connection to Paging NOC 300. In certain of these embodiments, such as where the status message is an error notification or a notification indicating that the wireless device is unable to establish a connection to the paging network, wireless device 100 can receive retransmitted paging messages from Paging NOC 300 through the direct connection to network 500 or through a dedicated network connection to Paging NOC 300.

One advantage of the systems and methods described herein, as can be seen in FIG. 1 and its accompanying description, is the ability for users to receive, view and respond to paging messages received from a paging NOC through a paging network on a cellular or other wireless device. In turn, this allows users to subscribe to paging (as well as cellular) services while only having to own, operate and monitor one device. Another advantage is that status and response messages can be sent back to the paging NOC from the wireless device through a secondary network such as a cellular network and/or Internet connection. Yet another advantage is that the wireless device can receive retransmitted messages through such secondary connection, such as in circumstances where the wireless device is unable to connect to the paging network. As a result, the reliability, portability and ease-of-use of the messaging system is increased.

Figure 2:
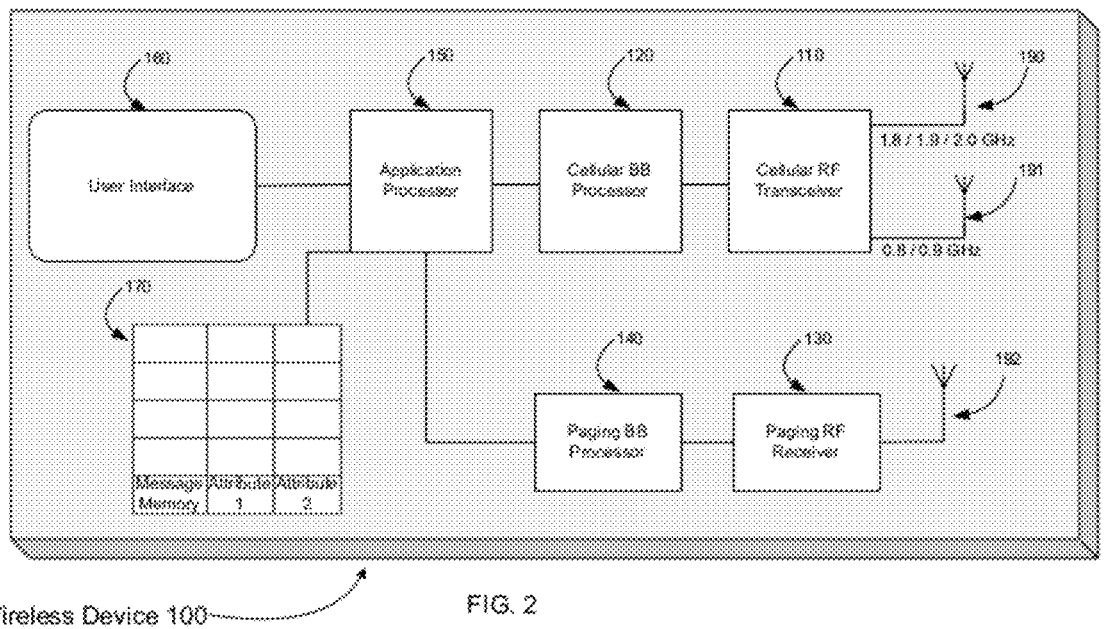
FIG. 2 is a schematic of a portion of the wireless device of FIG. 1 in accordance with certain embodiments.

FIGS. 2 through 5 are block diagrams which illustrate a portion of a wireless device suitable for use in accordance with certain embodiments. As shown in FIG. 2, in certain embodiments, wireless device 100 includes Cellular RF Transceiver 110 and Cellular Baseband ("BB") Processor 120, which may be any standard cellular transceiver components capable of receiving and decoding, as well as encoding and transmitting, voice and/or data signals over a cellular network, such as a GSM, CDMA, PHS, or any other suitable cellular network. Cellular RF Transceiver 110 utilizes one or more antennas, such as antennas 190 and 191, to transmit the signals to, and receive the signals from, the cellular network. In certain embodiments, such as is illustrated in FIG. 2, antennas 190 and 191 may be separate antennas. For example, antenna 190 may transmit and receive cellular signals over a frequency range of approximately 1.8-2.0 Gigahertz, while antenna 191 may transmit and receive cellular signals over a frequency range of approximately 0.8-0.9 Gigahertz. In other embodiments, antennas 190 and 191 may be a single antenna that is capable of transmitting and receiving cellular signals over one or more different cellular frequency ranges.

Cellular RF Transceiver 110 passes voice and/or data signals to, and receives voice and/or data signals from, Cellular BB Processor 120. Cellular BB Processor 120, in turn, decodes the voice and/or data signals received from Cellular RF Transceiver 110 and passes the decoded signals to Application Processor 150. Likewise, Cellular BB Processor 120 encodes the voice and/or data signals received from Application Processor 150 and passes the decoded signals to Cellular RF Transceiver 110. Application Processor 150 may be any standard computer processor, such as a CPU, microprocessor, or any other suitable type of computer processor, control unit or computer circuitry. Although Cellular RF Receiver 110, Cellular BB Processor 120 and Application Processor 150 are shown in FIG. 2 as separate components, in certain embodiments two or more of these components may be combined into a single chip. In certain other embodiments, Cellular BB Processor 120 may be specialized firmware or software running on a separate processor, or may be software code running on Application Processor 150.

According to certain other embodiments, wireless device 100 may also be any wireless device that is capable of communicating one or more networks other than the paging network, such as cellular, Wi-Fi, WiMAX, the Internet, and/or any other suitable networks. For example, wireless device 100 may be a PDA, tablet, laptop, smartphone, etc. In certain of these embodiments, wireless device may include a WiFi transceiver that can establish a connection to network 500 and transmit status and response messages to, and receive retransmitted paging messages from, paging NOC 300 through such connection.

As shown in FIG. 2, wireless device 100 also includes Paging RF Receiver 130 and Paging BB Processor 140, which may be any standard paging receiver components capable of receiving and decoding paging signals 360 over a paging network, such as FLEX or POCSAG, or any other suitable paging network. Paging RF Receiver 130 utilizes one or more antennas, such as antenna 192, to receive the signals from the paging network. In certain embodiments, such as is illustrated in FIG. 2, antenna 192 may be a separate antenna. In other embodiments, as described in more detail below, antenna 192 may be incorporated with another antenna included with wireless device 100 that is capable of receiving paging signals over the paging network from a paging NOC.

Paging RF Receiver 130 receives, through antenna 192, paging signals 360 that are transmitted from a paging NOC through a paging network, such as a FLEX or POCSAG Over-The-Air Protocol paging network, and passes the paging signals to Paging BB Processor 120. Cellular BB Processor 120, in turn, decodes the paging signals and passes any messages in the decoded signals, which are addressed to wireless device 100 to Application Processor 150. Although Paging RF Receiver 130, Paging BB Processor 140 and Application Processor 150 are shown in FIG. 2 as separate components, in certain embodiments two or more of these components may be combined into a single chip. In other embodiments, Paging BB Processor 140 may be specialized firmware or software running on a separate microprocessor, or may be software code running on Application Processor 150.

In certain embodiments, Application Processor 150 may cause various status messages and response messages to be transmitted back to the paging NOC. In accordance with certain of these embodiments, such as where wireless device is a cellular device, Application Processor 150 can cause Cellular RF Transceiver 110 to transmit these messages through the cellular network to a cellular NOC. The cellular NOC can then pass these messages to the paging NOC through any suitable network connection between the cellular and paging NOCs, such as an Internet connection. In accordance with certain other embodiments, Application Processor 150 can cause these messages to be transmitted to the paging NOC through a direct connection with the paging NOC, such as an Internet connection, or any other dedicated network connection with the paging NOC.

For example, in response to receiving a paging message from the paging NOC, wireless device 100 may transmit a status message back to the paging NOC acknowledging that the message has been received successfully. Wireless device 100 may also transmit other status messages to the paging NOC, such as notifications that the message has been received with errors or that the message has been read. In accordance with certain of these embodiments, wireless device 100 may also transmit notifications to the paging NOC that indicate whether or not the wireless device is able to establish an RF connection with the paging network. In other embodiments, wireless device may transmit response messages to paging NOC, such as when a user wishes to respond to a message received by wireless device 100. This functionality allows for bidirectional communication with the paging NOC, which provides a number of benefits. For example, one benefit is that the paging network can record a full audit trail of the delivery, receipt, read, and status of the messages, including any errors in the messaging process. Another benefit is that the system can better ensure that messages are received and read by users. For example, if the paging network does not receive an acknowledgement that a message has been received or read within a certain amount of time, receives an error notification, or receives a notification that the wireless device is unable to establish a connection to the paging network, the paging NOC can retransmit the message to the wireless device through the paging network and/or retransmit the message to the wireless device through an alternate network, such as a cellular network or a direct network connection with the wireless device. Importantly, this functionality increases the overall reliability and timeliness of the messaging system.

In certain embodiments, the paging functions, such as those associated with receiving and displaying paging messages and transmitting status and response messages back to the paging NOC, may be implemented in software running on Application Processor 150, such as a mobile device application. In other embodiments, these functions may be integrated in the operating system running on Application Processor 150. Alternatively, these functions could be incorporated on a specialized chip, such as a microprocessor, which may be connected to Application Processor 150, and which includes program instructions in firmware.

As shown in FIG. 2, wireless device 100 may also include memory 170, which can be utilized by Application Processor 150 to store paging messages decoded and passed from Paging BB Processor 140. In certain embodiments, one or more attributes may be included with the received messages, such as in the message header. In other embodiments, Application Processor 150 may associate one or more attributes, such as status attributes with the received messages. For example, these attributes may include certain information related to the status of the message, such as whether it was received with errors or whether it has been displayed, information related to the priority of the message, or information related to possible response actions. These attributes may also be stored in memory 170.

As shown in FIG. 2, wireless device 100 includes user interface 160, which may be connected to Application Processor 150. In certain embodiments, user interface 160 includes one or more hardware or software components, or a combination of hardware and software, which may be used to receive input from, and output information to, a user of wireless device 100. For example, as illustrated and described in connection with FIG. 9, user interface 160 may include a display, such as LCD or touch-screen, and/or display circuitry. In accordance with certain of these embodiments, in response to receiving a paging message over the paging network, Application Processor 150 may instruct the display circuitry to display the message. In certain embodiments, Application Processor 150 may also instruct the display circuitry to display a selectable response menu to the user as described in connection with FIG. 11. The messages and/or response menus may be displayed in any suitable manner that is consistent with standard procedures used by wireless device 100. In certain of these embodiments, Application Processor 150 may display the message based on a determination of whether or not to interrupt an application or process that is executing on wireless device 100, and/or to determine a particular color scheme used to display the message, as described in more detail in connection with FIGS. 8-10. In certain embodiments, where the display is a touch-screen, Application Processor 150 may also receive input from the user through the display and/or display circuitry, such as when the user touches portions of the display.

It will be appreciated that, in certain embodiments, user interface 160 may include a number of other standard hardware components, such as one or more visual, audio, or tactile mechanisms used to output information or alerts to, and receive input from, the user. For example, user interface 160 may also include one or more LEDs. As another example, user interface 160 may include a number of physical keys or buttons capable of receiving input from a user of the device. As yet another example, user interface 160 may include a speaker and/or microphone. In certain embodiments, the wireless device may output the text of received messages through the speaker, such as by outputting prerecorded audio messages or by converting the message text to audio using standard text-to-speech conversion mechanisms. In other embodiments, the wireless device may receive audio input from the user through a microphone, such as voice commands or message responses. As yet another example, user interface 160 may include a tactile alert mechanism, such as a mechanism capable of causing the wireless device to vibrate.

In certain of these embodiments, one or more of these visual, audio and/or tactile mechanisms may be used to generate one or more audible, visual or tactile alerts. For example, Application Processor 150 may generate such alerts by causing audio to be outputted through a speaker, causing one or more LEDs to turn on, or flash, and/or causing the wireless device to vibrate. In certain of these embodiments, Application Processor 150 may generate one or more of the alerts in response to receiving a new paging message. In other embodiments, Application Processor 150 may generate one or more alerts in response to a determination that an application or process that is executing on wireless device 100 should not be interrupted in order to display the received paging message. In yet other embodiments, Application Processor 150 may generate one or more alerts to indicate the status of the connection between wireless device 100 and the paging network.

Figure 3:
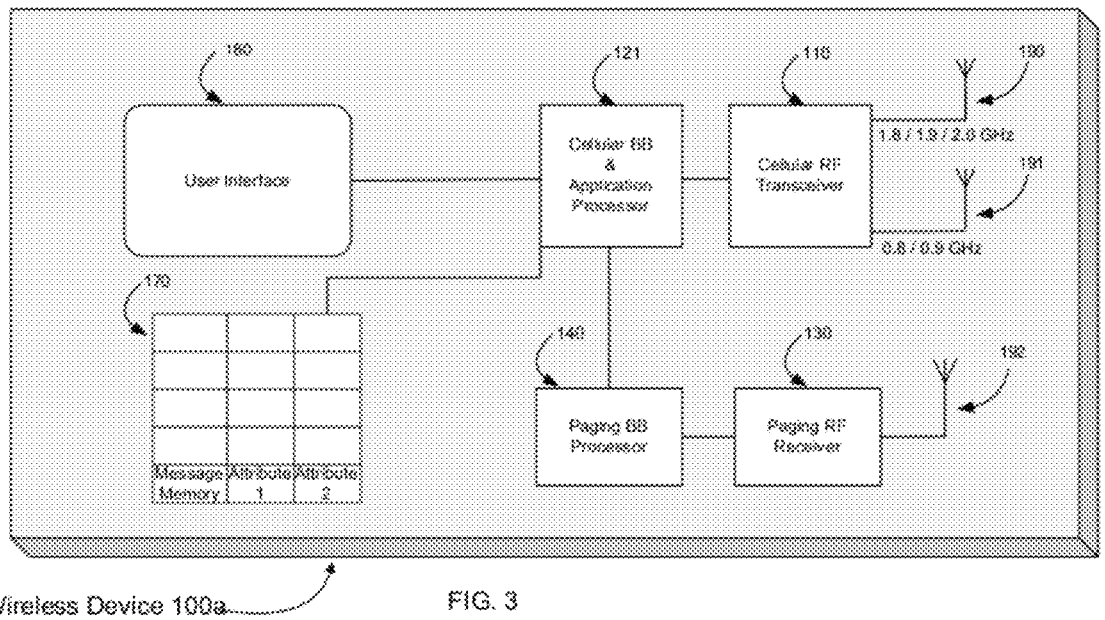
FIG. 3 is a schematic of a portion of the wireless device of FIG. 1 in accordance with other embodiments.
Figure 4:
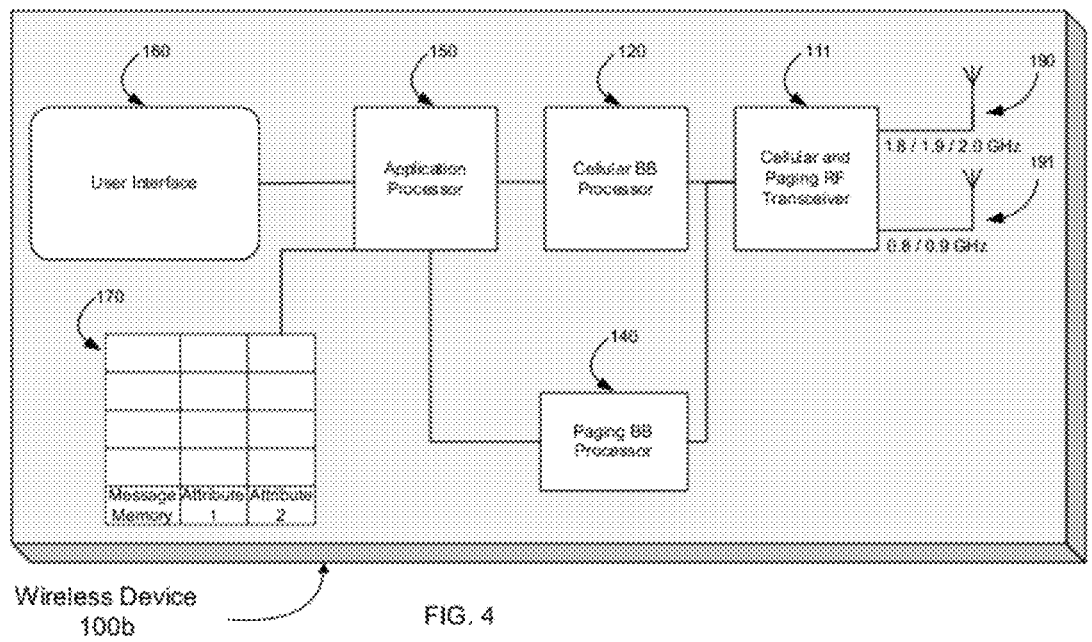
FIG. 4 is a schematic of a portion of the wireless device of FIG. 1 in accordance with yet other embodiments.
Figure 5:
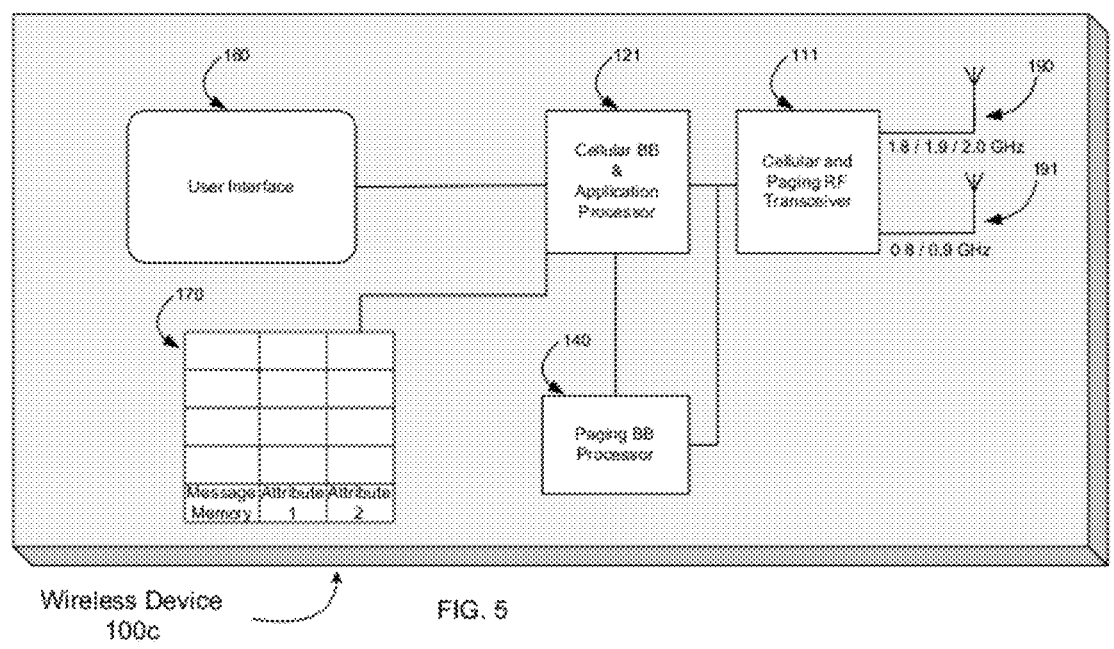
FIG. 5 is a schematic of a portion of the wireless device of FIG. 1 in accordance with further embodiments.

FIGS. 3-5 are block diagrams which illustrate a portion of a wireless device suitable for use in accordance with other embodiments. As shown in FIGS. 3-5, wireless devices 100a, 100b, and 100c may include generally the same components as wireless device 100 illustrated in FIG. 2. In the preferred embodiment, as can be seen from FIG. 2 and the accompanying description, Cellular BB Processor 120 and Application Processor 150 are separate processors in wireless device 100. Also, Cellular RF Transceiver 110 and Paging RF Receiver 130 are separate RF (trans/re)ceivers, both utilizing one or more separate antennas, such as antennas 190-192. As shown by wireless device 100a in FIG. 3, however, in certain embodiments, Cellular BB Processor 120 and Application Processor 150, may be replaced with a single processor, such as processor 121. Processor 121 performs the functions associated with both the cellular BB processor and the application processor. In certain of these embodiments Paging BB processor 140 may also be integrated within Processor 121, which can perform the functions associated with the cellular BB processor, the paging BB processor and the application processor.

Similarly, as shown by wireless device 100b in FIG. 4, in certain embodiments, Paging RF receiver 130 and Cellular RF Transceiver 110 may be combined into a single RF Transceiver, such as RF Transceiver 111. The paging RF transceiver is incorporated within the receiver portion of RF Transceiver 111. In accordance with certain of these embodiments, RF Transceiver 111 may utilize two antennas, such as antennas 190 and 191, which receive and transmit cellular signals over a cellular network and receive paging signals over a paging network. In other embodiments, RF Transceiver 111 may utilize a single antenna capable of communicating over both networks. In certain embodiments, as shown in FIG. 5, wireless device 100c may include both RF Transceiver 111 and processor 121.

In certain of these embodiments, such as where the paging receiver and cellular transceiver are combined in a single transceiver, or where the wireless device utilizes a single antenna, the wireless device may time-share the transceiver and/or antenna in a manner to allow an optimal scan of the paging channel while also allowing cellular connectivity. For example, in a FLEX paging system, the wireless device may utilize the paging part of the transceiver and/or the antenna during the correct home frames of the FLEX paging network. This would allow the paging receiver to use the antenna during the particular frames utilized for its paging address and, even then, only for a very short period unless a message is present, in which case the paging receiver may remain in control to capture the paging message. In certain embodiments, during other, non-home frame, periods the transceiver and/or antenna may be utilized by the wireless device as needed, such as to access the cellular or other wireless networks.

Accordingly, whenever the disclosure provided herein refers to a function performed by Application Processor 150 or Cellular BB Processor 120, it should be understood that such function may be performed by the combined processor 121. Likewise, whenever the disclosure provided herein refers to a function performed by Cellular RF Transceiver 110 or Paging RF Receiver 130, it should be understood that such function may be performed by the combined RF Transceiver 111 and whenever the disclosure provided herein refers to a function performed by antenna 192, it should be understood that such function may be performed by antennas 190 or 191, which could themselves be a single combined antenna. In addition, whenever the disclosure provided herein refers to a function performed by wireless device 100, it should be understood that such function may be performed by any of wireless devices 100a, 100b, and 100c.

As can be seen from FIGS. 1-5 and their accompanying descriptions, the systems and methods described herein allow users to receive, view, and respond to messages received from a paging network on a wide range of cellular and other wireless devices. Accordingly, one significant advantage, is that these individuals can receive the benefits associated with paging services, such as increased reliability, without the need to purchase, carry and operate a separate paging device.

Figure 6:
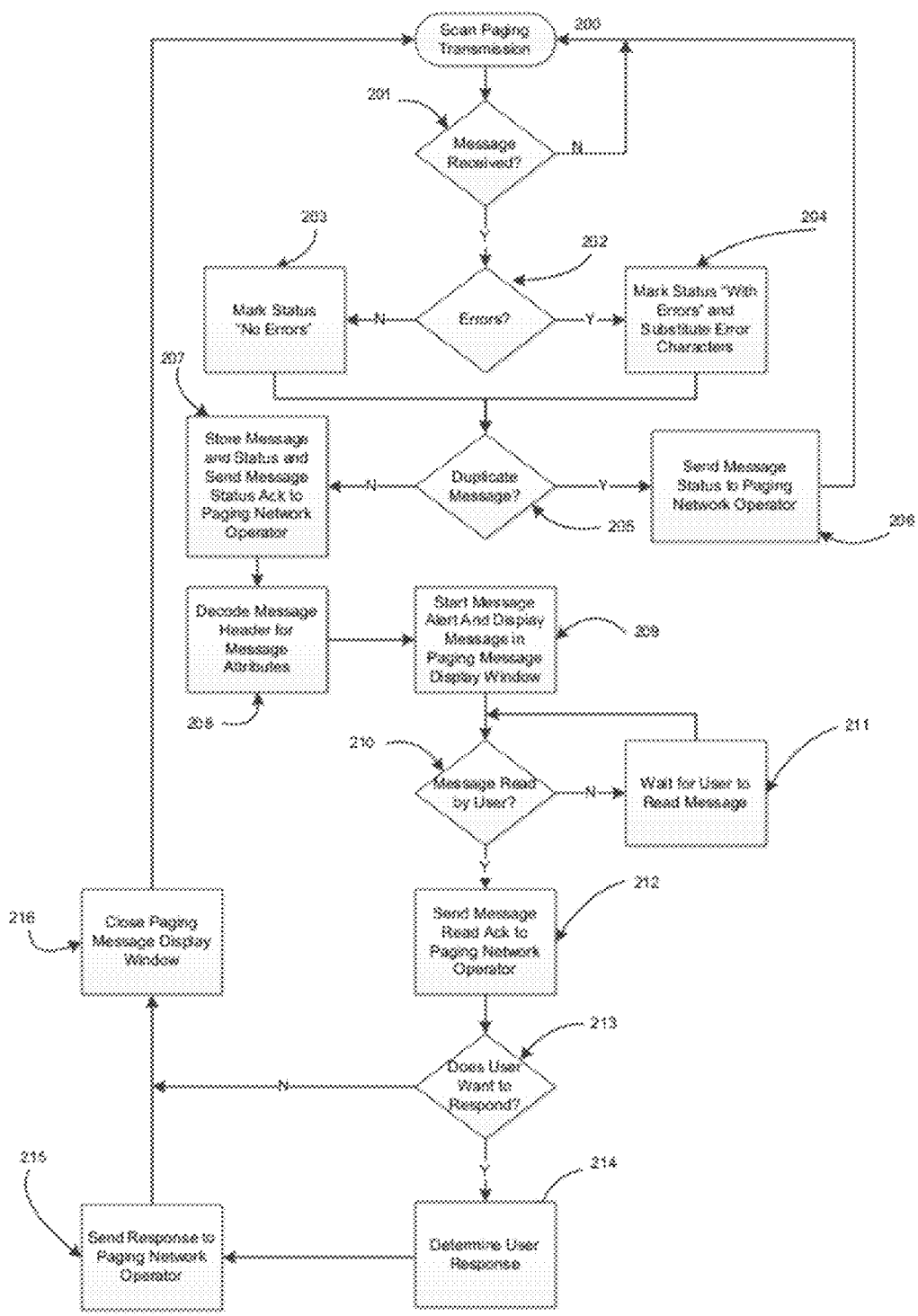
FIG. 6 is a flow diagram of a process that may be used by the wireless device in accordance with certain embodiments.

FIG. 6 is a flowchart illustrating the operation of the wireless device described in FIGS. 1-5 in accordance with certain embodiments. At step 200, Paging RF Receiver 130 of wireless device 100 scans the appropriate paging frequency for any new transmissions from the paging NOC over the paging network. In response to detecting a transmission, at step 201, Paging RF Receiver scans the transmission for the address of wireless device 100. If the address of wireless device 100 is not detected, flow returns to step 200 and Paging RF Receiver 130 continues to scan the appropriate paging frequency for any new transmissions. Otherwise, in response to detecting the address of wireless device 100 in the transmission, Paging RF Receiver 130 captures the transmission and passes the associated data to the Paging BB Processor 140 for decoding. Paging BB Processor 140 decodes the received data into a message based upon the appropriate standard paging protocol, (e.g., FLEX, POCSAG, etc.). At step 202, Paging BB Processor 140 checks to see if the decoded message has any errors. If errors are detected, flow proceeds to step 204 and Paging BB Processor 140 attempts to correct any errors that are correctable by using any standard error detection and correction mechanisms (e.g., using a checksum or other similar algorithm to correct any errors or replacing missing characters with error characters). Paging BB Processor also marks the status of the message appropriately, such as "With Errors." On the other hand, if no errors are detected, flow proceeds to step 203 and Paging BB Processor 140 marks the status of the message appropriately, such as "No Errors." In either case, flow then proceeds to step 205.

At step 205, Paging BB Processor 140 passes the message to Application Processor 150, which compares the received message with any previously stored messages to determine if it is a duplicate message. Application Processor 150 may base this determination, in part, on a comparison of one or more attributes included with the received message to one or more attributes included with the stored messages. In accordance with certain embodiments, such as where a connection to the paging network is weak or unavailable, Application Processor 150 may receive the message (e.g., a retransmitted or new message) from Cellular BB Processor 120 instead of Paging BB Processor 140. In other embodiments, Application Processor 150 may receive the message from other circuitry in wireless device 100 that manages a network connection for the wireless device, such as a dedicated network or Internet connection. If the received message is determined to be a duplicate message, at step 206, Application Processor 150 may cause Cellular RF Transceiver 110 to transmit a status message to the paging NOC, in accordance with the process discussed below, and flow returns to step 200, where Paging RF Receiver 130 continues to scan the appropriate paging frequency for any new transmissions. Otherwise, if the received message is determined not to be a duplicate message, Application Processor 150 stores the received message and the message status in memory 170 at step 207. In certain embodiments, as discussed below, Application Processor 150 may also store any message attributes detected in the received message. In certain of these embodiments, Application Processor 150 may also, or alternatively, store additional attributes associated with the received message, such as a timestamp or delivery status in memory 170.

Application Processor 150 may also cause Cellular RF Transceiver 110 to transmit a status message indicating the status of the received message (e.g., received successfully or received with errors) to the paging NOC through the cellular network and a connection between the cellular network and the paging NOC. Although in this example, e.g., where the wireless device is a cellular device, the status message is transmitted to the paging network through the cellular network, in other embodiments, the wireless device may transmit the status message to the paging NOC through a direct network connection, such as a Wi-Fi, WiMAX, or hardwire Internet connection with the paging NOC. In yet other embodiments, such as where the paging network is capable of bidirectional communication, the wireless device may transmit the status message to the paging NOC over the paging network. In certain embodiments, Application Processor 150 may cause the status message to be transmitted to the Paging NOC prior to determining whether the received message is a duplicate message. In certain embodiments, such as in response to transmitting a status message to the Paging NOC that indicates the message was received with errors, the wireless device may receive a retransmitted message from the Paging NOC. In accordance with certain of these embodiments, the wireless device may receive the retransmitted message over the paging network. In other embodiments, the wireless device may receive the retransmitted message over an alternate network such as a cellular network or the Internet.

At step 208, Application Processor 150 checks the message header for any attributes that may be included with the message and decodes any such attributes. For example, the message may include a message priority attribute, as discussed in more detail in connection with the process described in FIG. 8. As another example, the message may include one or more response attributes, as discussed in more detail in connection with the process described in FIG. 11.

At step 209 Application Processor 150 causes user interface 160 to display the received message. In certain embodiments, Application Processor 150 may transfer the received message to display circuitry included in the wireless device and cause the display circuitry to display the message such as in a paging message display window, such as a pop-up window on the display, or any other suitable display mechanism. According to certain embodiments, as is discussed in connection with FIGS. 8 and 9, Application Processor 150 may determine whether or not to interrupt a current application to display the received message and/or may determine a color scheme for display, based on the priority of the message. Application Processor 150 may also generate one or more audio, visual, or tactile alerts, such as alerts indicating that a new message has been received or that a new message has been received but not displayed. In certain of these embodiments, the received message or the alerts may be displayed, or managed, in accordance with standard procedures used by wireless devices, such as are used in connection with SMS text messaging.

After displaying the message, at step 210 Application Processor 150 detects whether the message has been acknowledged or read by the user of wireless device 100 (e.g., by the user pressing one or more keys on, or the display screen of, the wireless device) and, if not, Application Processor 150 waits for the user to acknowledge and/or read the message at step 211. In certain embodiments, in response to determining that a certain period of time has passed without such acknowledgement, Application Processor 150 may stop displaying the message (e.g., by closing the paging message display window). In certain of these embodiments, Application Processor 150 may transmit a status message indicating the lack of acknowledgment to the paging NOC in a similar manner to the process described in connection with step 207. Once the user has read the message, at step 212 Application Processor 150 causes a "message read" status message to be transmitted to the paging NOC. The message read status message may be transmitted to the paging NOC in a similar manner to that described in connection with step 207 above.

At step 213 Application Processor 150 determines whether the user wants to respond to the received message. For example, Application Processor 150 may receive a notification from user interface 160 when the user chooses to respond to the message, such as by the user pressing a key on, or a "reply" button on the display screen of, wireless device 100, the user inputting a voice command into a microphone, or any other suitable user input mechanism. If Application Processor 150 determines that the user does not want to respond to the message (e.g., by receiving a notification that the user chose to close the message), the flow proceeds to step 216.

Otherwise, at step 214, Application Processor 150 determines a user response message. In certain embodiments, Application Processor 150 may determine a plurality of user response actions based on the received message and/or one or more attributes included in the received message, as well as data stored on the wireless device, and cause user interface 160 to display a selectable response menu to the user, as discussed in connection with FIG. 11. At step 215, Application Processor 150 causes the response message to be transmitted to the paging NOC in a similar manner to that described in connection with step 207 above. At step 216, Application Processor 150 causes user interface 160 to stop displaying the message (e.g., by closing the paging message display window). In accordance with certain of these embodiments, Application Processor 150 may also, or alternatively, disable any alerts associated with the received message. The process then returns to step 200 and Paging RF Receiver 130 continues to scan for new transmissions from the paging network.

In certain embodiments, the systems and methods described above can be used to multicast messages to groups of users. For example, the paging NOC can create and transmit a message, which is addressed to more than one wireless or paging device. Each device to which the message is addressed could then receive the message at the same time. As a result, one advantage is that messages, such as emergency notifications or instructions, can be broadcast to specified groups of individuals simultaneously, which could minimize the delay associated with the receipt of, and response to, such messages.

Figure 7:
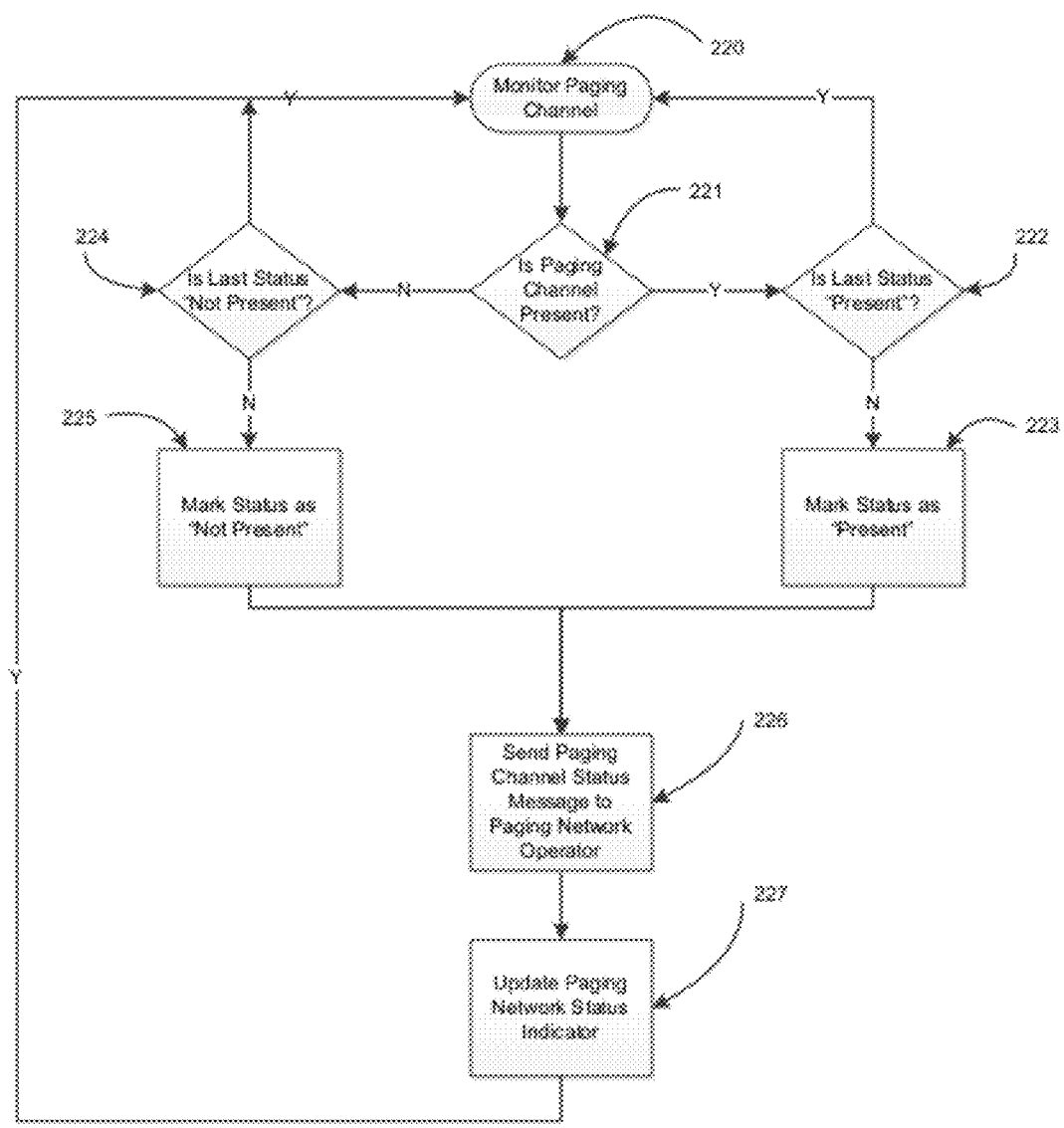
FIG. 7 is a flow diagram of another process that may be used by the wireless device in accordance with certain embodiments.
Figure 6:
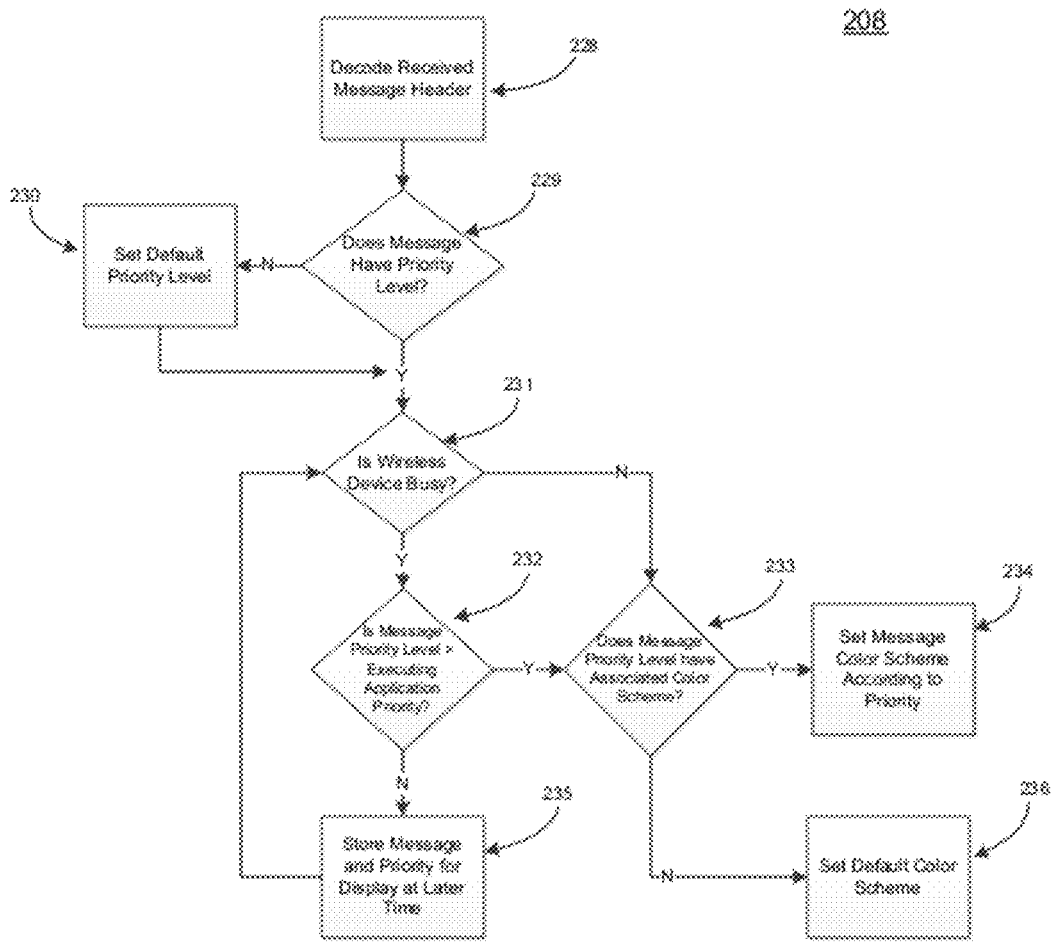

FIG. 7 is a flowchart further illustrating the operation of the wireless device described in FIGS. 1-5 in accordance with certain embodiments. Wireless device 100 can monitor the status of its connection to the paging network (i.e., the ability to receive paging messages from the paging network through Paging RF Receiver 130 and/or antenna 192). This status can then be transmitted to the paging NOC, which in certain embodiments, can then send messages to wireless device 100 through an alternate network connection, such as a cellular network, Internet connection or any other suitable network. This increases the reliability with respect to the delivery and receipt of messages by allowing for alternate message delivery paths to be utilized to deliver messages to wireless device 100, such as in circumstances where wireless device 100 is unable to connect to, and/or receive messages from, the paging network.

As shown in FIG. 7, at step 220, Paging RF Receiver 130 scans the appropriate paging frequency and, at step 221, it detects whether or not the paging channel is present (e.g., whether the paging network is available) and passes a notification to Application Processor 150 indicating the status of the paging channel. In accordance with certain of these embodiments, wireless device 100 may determine that the paging message is not present based on detecting that a connection cannot be established with the paging network. In other embodiments, the wireless device may determine that the paging network is not present based on detecting that the signal received from the paging network is too weak, or that one or more messages have been received with errors. If the paging channel is present, the flow proceeds to step 222, otherwise the flow proceeds to step 224.

At step 222, Application Processor 150 checks whether the previously stored paging channel status is marked as "Present." In certain embodiments, the paging channel status may be stored in memory 170 of wireless device 100. If the previously stored paging channel status is marked as "Present," the flow returns to step 220 and wireless device 100 continues to monitor the status of the paging channel. Otherwise, at step 223 Application Processor 150 marks the paging channel status as "Present," and flow proceeds to step 226. If the paging channel is not present, Application Processor 150 checks whether the previously stored paging channel status is marked as "Not Present." If the previously stored paging channel status is marked as "Not Present," the flow returns to step 220 and wireless device 100 continues to monitor the status of the paging channel. Otherwise, at step 225 Application Processor 150 marks the paging channel status as "Not Present," and flow then proceeds to step 226.

At step 226, Application Processor 150 causes a status message to be transmitted to the paging NOC indicating the status of the connection between the wireless device and the paging network. The status message may be transmitted to the paging network in a similar manner to that described in connection with FIG. 6 above. At step 227, Application Processor 150 may cause display circuitry 180 to update a paging channel status indicator on the display of wireless device 100. Flow then returns to step 220 and wireless device 100 continues to monitor the status of the paging channel.

In certain embodiments, wireless device 100 may monitor the status of its connection with other networks, such as a cellular network or Internet connection and transmit one or more status messages to paging NOC indicating the status of these connections, in a similar manner as described above in connection with FIG. 7. In accordance with certain of these embodiments, wireless device 100 may generate one or more audio, visual, and/or tactile alerts in response to determining that a connection to a network, such as a cellular network, or the Internet, is not present. Wireless device 100 may later disable such alerts in response to determining that the connection to such network is present.

In accordance with certain of these embodiments, in response to receiving a status message indicating that the paging network is unavailable on wireless device 100, the paging NOC can direct the cellular NOC to retransmit messages, and/or transmit any new messages, to wireless device 100 through the cellular network, or can communicate such messages to wireless device 100 through a direct network connection with the wireless device. The direct transmission of messages to wireless device 100 may replace, or may be in addition to, the transmission of such messages to wireless device 100 over the paging network. In accordance with certain of these embodiments, the paging NOC may cease, or may direct the cellular NOC to cease, the transmission or retransmission of messages to wireless device 100 through these alternate networks, in response to receiving a status message that a connection to the paging network is available on wireless device 100.

Accordingly, the successful delivery and receipt of messages is maximized, and any associated delay is minimized, by providing alternate message delivery mechanisms in certain situations, such as where paging messages cannot be received successfully by the wireless device over the paging network. In turn, this provides redundancy and, therefore, results in an overall increase to the reliability of the messaging system.

FIG. 8 is a flowchart further illustrating the operation of the wireless device described in FIGS. 1-5 in accordance with certain embodiments. Paging messages received by wireless device 100 may include a message priority attribute with a received paging message, such as an attribute that indicates a priority value or class for the received message. In response to receiving and decoding the message priority attribute, the wireless device can determine when and/or how to display the received message based, at least in part, on the message priority attribute. In certain embodiments, wireless device 100 can use the message priority attribute to determine whether or not to interrupt an executing application or process in order to display the received message. In other embodiments, wireless device 100 may determine a color scheme based on the message priority attribute for displaying the received message. These features further increase the reliability and ease-of-use of the messaging system by ensuring that important messages are displayed promptly and that certain types of messages are easily recognizable by their recipients. The process illustrated in FIG. 8 pertains to this priority based messaging functionality.

As shown in FIG. 8, in connection with receiving a paging message, at step 228 Application Processor 150 decodes the header of the received paging message for any message attributes included in the received message. At step 229, Application Processor 150 determines whether the message header includes a message priority attribute. If not, at step 230, Application Processor 150 may associate a default message priority attribute, such as a predefined priority level, with the received message. In certain embodiments, the message priority attribute may be a number or value that indicates the priority level of the received message. In other embodiments, the message priority attribute may indicate a priority class or group for the received message. In yet other embodiments, the message priority attribute may be any attribute pertaining to the priority of the received message Although in this example, the message priority attribute is included within the message header, in other embodiments, Application Processor 150 may determine the priority based on the content of the received message. In accordance with certain of these embodiments, Application Processor 150 may scan the message content for certain characters, words or phrases, such as "emergency," "code blue," or "fire," and set the priority based on detecting such content. In other embodiments, Application Processor 150 may determine the message priority based on other information associated with the message such as the sender of the message and/or previously received messages. For example, messages from certain senders may always be set to a high priority. As another example, messages that are received multiple times within a short period of time may be set to a high priority. As yet another example, Application Processor 150 may compare one or more previous messages sent by the sender to determine the priority level. The message priority attribute may be stored with the received message in memory 170.

At step 231, Application Processor 150 determines whether the wireless device is busy (e.g., whether an application or process is executing on wireless device 100). For example, where wireless device 100 is a cellular device, the user of the wireless device may be on a phone call. As another example, the user may be browsing the Internet, reading or writing an e-mail or text message, playing a game, or running one or more other applications on wireless device 100. Also, wireless device 100 may be running other processes, such as scanning, or receiving or transmitting data over, the cellular, paging, or other network. If Application Processor 150 determines that wireless device 100 is not busy, the flow proceeds directly to step 233. Otherwise, if Application Processor 150 determines that wireless device 100 is busy, e.g., running a process or application, at step 232 Application Processor 150 determines whether the priority of the received message is greater than the priority of the executing application or process. In certain embodiments, as is discussed in more detail in connection with FIG. 9, wireless device 100 may include one or more priority tables stored in memory 170 that indicates the priority relationship of certain applications and/or processes that run on, and the types of messages that may be received by, the wireless device. Application Processor 150 may use this priority list to compare the priority of the executing application or process to the priority level of the received message. In certain of these embodiments, Application Processor 150 may compare the priority level of the received message to the priority level of a plurality of applications or processes running on wireless device 100. In other embodiments, Application Processor 150 may determine whether to interrupt an executing application based on whether the priority of the received message is above a specified threshold. In accordance with certain of these embodiments, the threshold may be a predefined threshold that is based on, or may be customized by, the user of the wireless device.

If Application Processor 150 determines that the priority level of the received message is lower than the priority level of one or more executing applications or processes, at step 235 Application Processor 150 causes the received message and message priority attribute to be stored in memory 170 for display at a later time. In certain embodiments, Application Processor 150 can repeatedly check whether the wireless device is busy, and whether one or more messages in memory 170 that have not been displayed have a higher priority level than a currently executing application or process. In accordance with certain of these embodiments, Application Processor 150 may cause a status message to be transmitted to the paging NOC indicating that the message cannot be displayed in a similar manner to that described in connection with FIG. 6.

In response to determining that either the wireless device is not busy or the priority of the received message is higher than the priority of one or more executing applications or processes, flow proceeds to step 233, at which time Application Processor 150 determines whether a color scheme should be used to display the message. In certain embodiments, as is discussed in more detail in connection with FIG. 9, wireless device 100 may include a stored color scheme table, which indicates the color scheme that is to be applied to certain types of paging messages. If Application Processor 150 determines that a color scheme should be used, at step 234, Application Processor 150 applies the color scheme to the message. Otherwise, at step 236, Application Processor 150 applies a default color scheme to the message, such as a predefined color scheme. In certain embodiments, Application Processor 150 may then cause user interface 160 to display the message, e.g., by causing the message to be displayed on a screen of wireless device 100, in accordance with the process described in FIG. 6.

Figure 9:
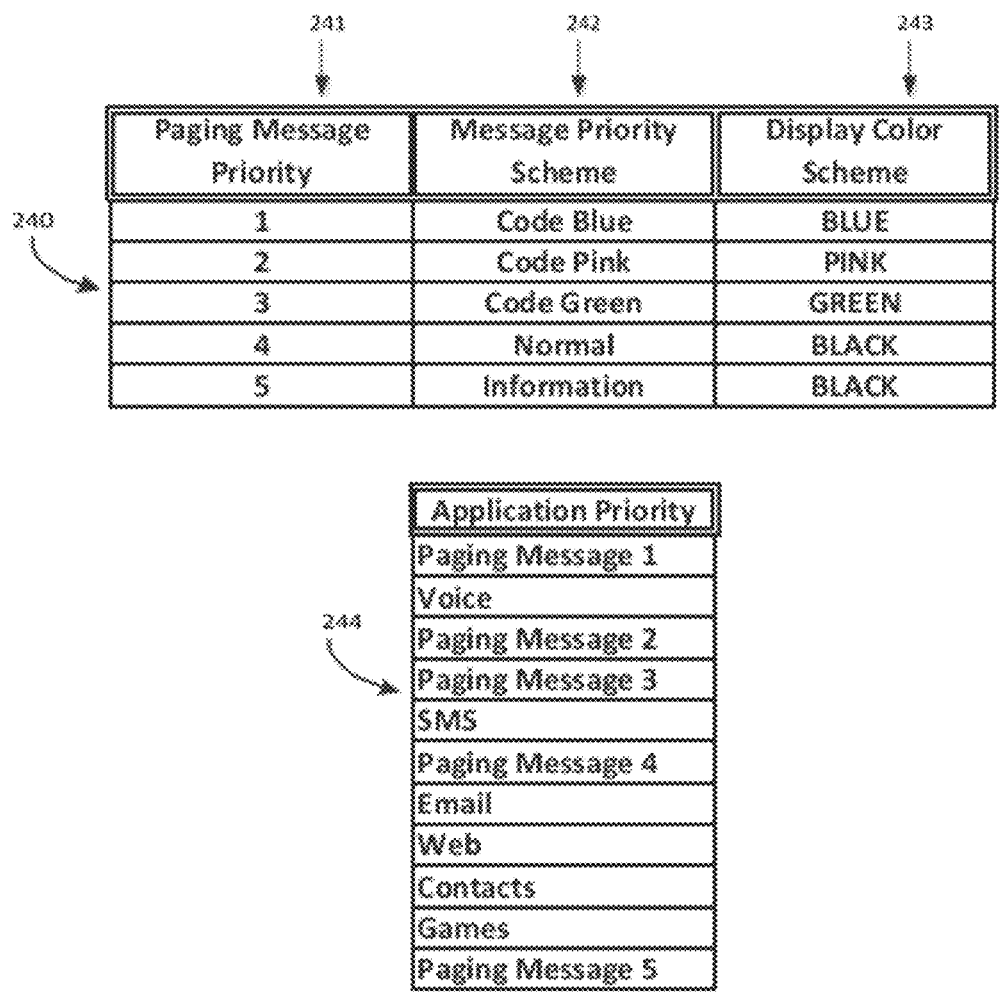
FIG. 9 is a block diagram illustrating information that may be stored and used by the wireless device according to certain embodiments.

FIG. 9 is a block diagram of data stored in the wireless device in accordance with certain embodiments. The particular tables illustrated by FIG. 9 are an exemplary diagram of the types of priority-related and color scheme tables that may be utilized by Application Processor 150 in connection with determining when and how to display a paging message received at the wireless device from a paging NOC. As shown in FIG. 9, wireless device includes a message priority table 240. Message priority table 240 may include one or more lists of information related to the priorities and color schemes of certain paging messages. As depicted in FIG. 9, message priority table 240 includes paging message priority list 241, with entries for paging message priority levels one through five. Message priority table 240 also includes a message type list 242 and a color scheme list 243, which include entries that correspond to each of the message priority levels in paging message priority list 241. For example, as shown in FIG. 9, paging message priority level one is associated with "code blue" paging messages and a blue color scheme. A "code blue" message is a type of message, typically used by hospitals, that indicates an emergency situation, such as a life-or-death incident. As another example, paging message priority level two is associated with "code pink" paging messages and a pink color scheme. As yet another example, paging message priority level three is associated with "code green" paging messages and a green color scheme. "Code pink" and "code green" messages are types of messages, also typically used by hospitals, that indicates a child abduction situation and the presence of hazardous materials, respectively.

In certain embodiments, a particular message priority level may be associated with more than one type of paging messages. Similarly, more than one message priority level may be associated with a particular color scheme, such as is illustrated in FIG. 9, where the color scheme "black" is associated with message priority levels four and five. In certain embodiments, message priority table 240 may also include a "default" message priority level and/or color scheme, which is used to display any received paging messages that do not include a message priority attribute. In certain of these embodiments, the default priority and/or color scheme may be customizable by the, or based on the type of, user.

As is also shown in FIG. 9, in certain embodiments, wireless device 100 may additionally or alternatively include application priority table 244 stored in memory 170. Application priority table 244 includes a list of at least some of the applications and processes that may execute on wireless device 100, as well as types of paging messages that may be received by the wireless device. In certain embodiments, these applications, processes, and messages may be listed in descending order of priority. As illustrated in FIG. 9, application priority table 244 includes eleven entries, including "Paging Message 1," "Voice," "Paging Message 2," "Paging Message 3," and "SMS," which correspond to the applications, processes, and messages with the five highest priorities, respectively. In certain embodiments, as shown in FIG. 9, application priority table 244 may include classes of paging message that correspond to the paging message priorities in paging message priority table 240.

In accordance with certain of these embodiments, Application Processor 150 may utilize message priority table 240 and application priority table 244 to determine whether to interrupt an executing application or process in order to display received paging messages, as well as to determine a color scheme that should be applied when displaying the messages in accordance with the embodiments illustrated and described in connection with FIG. 8. For example, if the user of wireless device 100 is on a phone call and the wireless device receives a "code blue" message, Application Processor 150 can determine that the voice call should be interrupted to display the message because the priority of a "code blue" message (e.g., paging message 1) is higher than the priority of a voice call. Application Processor 150 can also determine that a blue color scheme should be applied to the message based on paging message priority table 240. If, however, a "code green" message is received while the user is on a voice call, Application Processor 150 can determine that the voice call should not be interrupted, and may store the message for later display. At a later time, if Application Processor 150 determines that wireless device 100 is no longer busy, or an application with a lower priority than a "code green" message is executing, such as email application or a game, Application Processor 150 can then apply a green color scheme to the message and cause the message to be displayed. In accordance with certain of these embodiments, the priority levels of the classes of paging messages as well as the respective priorities of the applications, processes and messages may be customized by, or based upon, a user of the wireless device.

Figure 10:
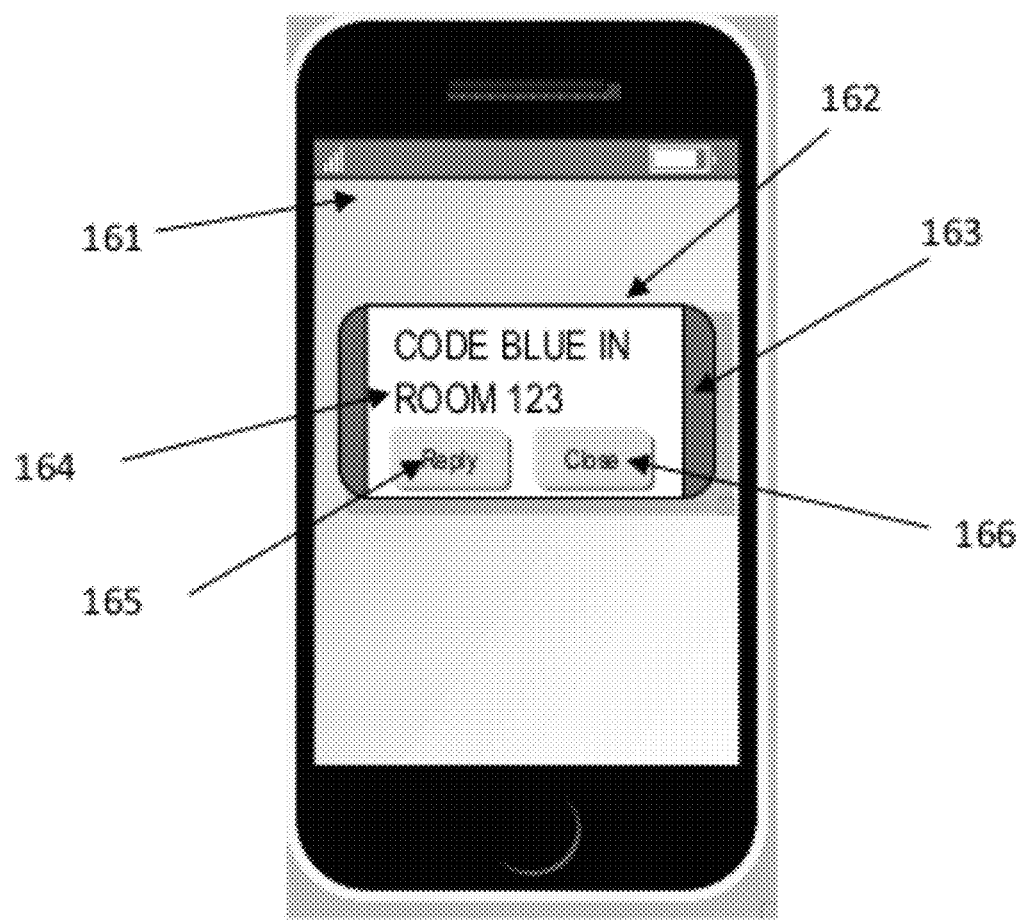
FIG. 10 is a schematic illustrating a portion of the wireless device according to certain embodiments.

FIG. 10 is a pictorial diagram of the display of the wireless device described in FIGS. 1-5 in accordance with certain embodiments. The particular display shown in FIG. 10 is an exemplary illustration of a type of display that may be presented to a user of wireless device 100 in connection with a certain priority level associated with a paging message received from paging NOC 300. As shown in FIG. 10, wireless device 100 includes a display screen 161 that includes a paging message display window 162. Paging message display window 162 may include message text 164 corresponding to the body of a received paging message, which, in the example shown in FIG. 10, includes the text "Code Blue In Room 123."

In certain embodiments, paging message display window 162 may also include one or more buttons, such as reply button 165, and close button 166 shown in FIG. 10. In certain of these embodiments, a user of wireless device 100 may select one of these buttons in order to respond to the message, or close the paging message display window, in accordance with the processes described in FIGS. 6 and 11. As shown in FIG. 10, in certain of these embodiments, such as where display 161 is a touch screen, these buttons may be selected by pressing on a portion of display 161. In other embodiments, these functions may be selected by pressing one or more keys included on wireless device 100, or by any other suitable input means, such as voice commands through a microphone. In certain embodiments, the paging message received by wireless device 100 may include a message priority attribute in accordance with the process illustrated and described in connection with FIGS. 8-9. In certain of these embodiments, such as is illustrated in FIG. 10, paging message display window 162 includes a message display border 163 that corresponds to the color scheme associated with the received message. For example, as illustrated in FIG. 10, paging message 164 is a "code blue" message associated with a blue color scheme, in which case message display border 163 may have a blue background. As another example a paging message may be received with a message priority attribute that indicates that the message is an "active fire" message, which announces the need for firefighters to respond to a fire. Message display border may then be displayed with a red background. In other embodiments, the color scheme of the received message may be used to modify the color of paging message text 164 and/or the background of paging message display window 162.

Figure 11:
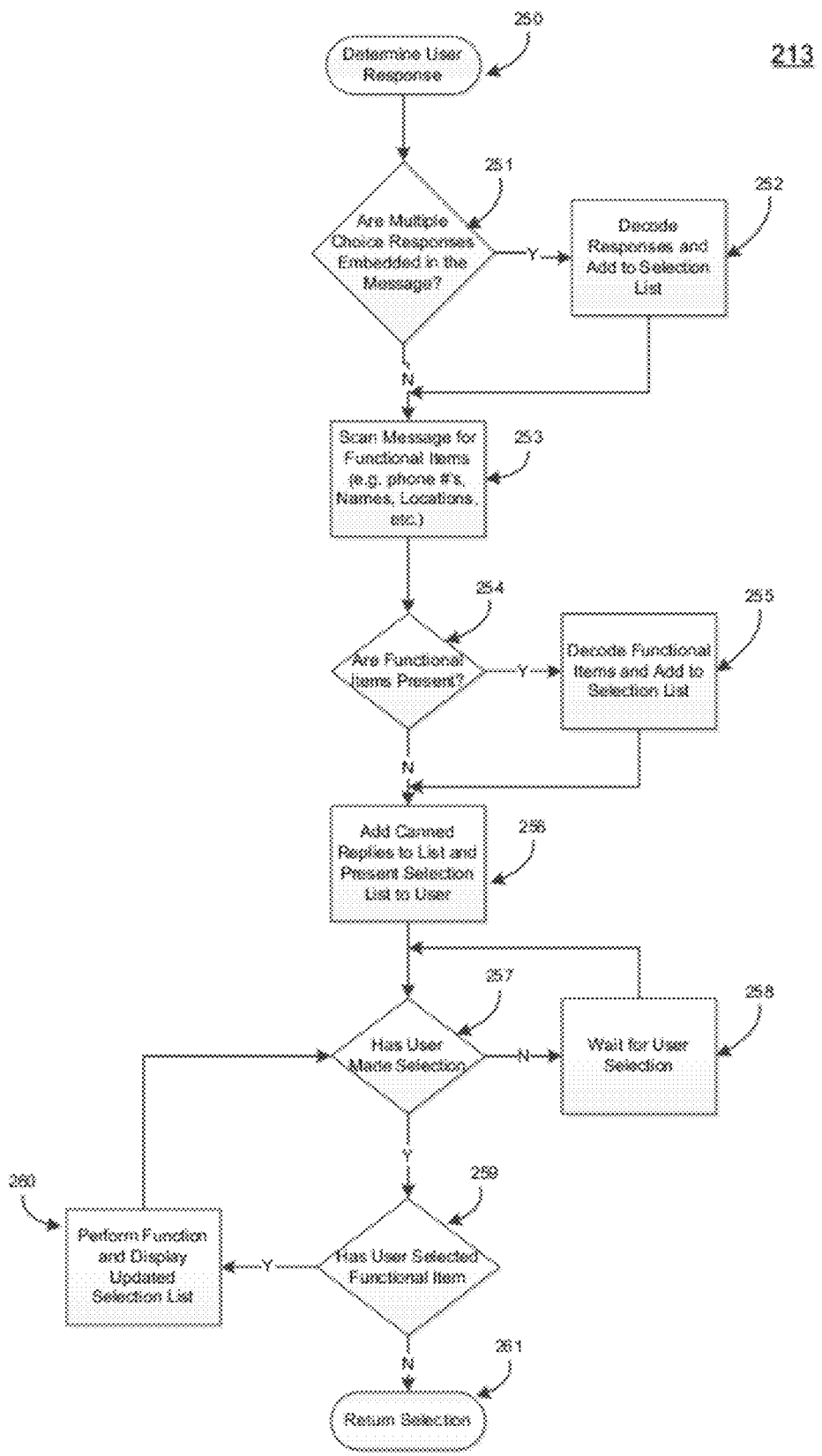
FIG. 11 is a flow diagram of yet another process that may be used by the wireless device in accordance with certain embodiments.

FIG. 11 is a flowchart further illustrating the operation of the wireless device described in FIGS. 1-5 in accordance with certain embodiments. In response to receiving and displaying a paging message, such as in accordance with the processes described in connection with FIG. 6, wireless device 100 may determine a plurality of user response actions based, at least in part, on the received message. In certain embodiments, the user response actions may include transmitting one or more reply messages (e.g., predefined, canned, or custom responses), using one or more response mechanisms (e.g., e-mail, voice call, text message, etc.), performing functions associated with other applications on the wireless device (e.g., creating contact entries, calendar entries, etc.) or any other actions related to responding to, or managing, the received message.

In certain embodiments, wireless device 100 may determine whether one or more searchable items are present in the message body. In certain of these embodiments, wireless device 100 can then search data stored in the memory of the wireless device, such as a contact list or other databases, for entries matching the searchable items, and generate one or more user response actions based on the matching entries. Wireless device 100 may also include a predefined list of response messages stored in memory and generate one or more user response based on the stored list. In certain embodiments, the received paging message may include one or more response attributes, such as a list of predefined response options, and/or response mechanisms, and the wireless device can generate one or more user response actions based on the response attributes. In certain of these embodiments, the wireless device can generate a selectable response menu based, at least in part, on the plurality of user response actions and may display the selectable response menu to a user. In response to receiving a notification that the user has selected one of the menu options, the wireless device may transmit a response message to the paging NOC based on the user's selection. These features allow users to respond to received paging messages quickly and efficiently and, in turn, increases the overall reliability and ease-of-use of the messaging system. The process illustrated in FIG. 11 pertains to this user response action functionality.

As shown in FIG. 11, at step 250, Application Processor 150 receives a notification through user interface 160 that the user wants to reply to the received paging message in accordance with the process described in connection with FIG. 6. At step 251, Application Processor 150 determines whether the paging message header includes a response attribute, and if so, Application Processor 150 decodes the response attribute at step 252. In certain embodiments, as is illustrated in FIG. 11, the response attribute may include one or more predefined responses, such as a multiple choice list of response options. In other embodiments, such as where the received paging message was transmitted to multiple recipients, the response attribute may include one or more response mechanisms, including the option to reply to all, or a subset, of the recipients. In yet other embodiments, the response mechanism may indicate that any response to the message should be delivered to a person other than the sender, either directly (such as through email or text message) or via the paging NOC. In yet other embodiments, the response mechanism may indicate that the message recipient should call a specified individual. In accordance with certain of these embodiments Application Processor 150 may then add these response options and/or mechanisms to a selection list that may be stored in memory 170.

At step 253, Application Processor 150 may determine whether the received paging message includes one or more functional items, such as by scanning the message text for certain recognizable characters, words, or phrases. In certain embodiments, these functional items may include names, phone numbers, addresses, e-mail addresses, user names, uniform resource locators (URLs), date, time, or other items, such as information that may be used to search for matching data stored on wireless device 100. In response to determining that one or more functional items are present in the received paging message, Application Processor 150 decodes the functional items and adds them to the stored selection list at step 255.

At step 256, Application Processor 150 may add one or more predefined (e.g., canned) responses, that are stored in memory 170, to the stored selection list. In certain embodiments, Application Processor 150 may determine which of these predefined response to include in the stored selection list based on the text of the received paging message. Application Processor 150 may then cause a selectable response menu to be displayed on wireless device 100 based, at least in part, on the stored selection list. In accordance with certain of these embodiments, the selectable response menu may include an option for the user to input a custom response message. Although in the example illustrated in FIG. 11 Application Processor 150 checks for the existence of, and/or determines whether to generate user response actions based on, predefined responses in the message header, searchable items in the message content, and predefined responses stored in the wireless device, it should be understood that in certain embodiments, only one or two of these items, may be checked and/or used to generate the user response actions. In other embodiments, other information associated with the received message and/or stored in the wireless device may be utilized instead of, or in combination with, such items in order to generate the user response actions.

At step 257, Application Processor 150 determines whether the user has selected one of the selectable response options and, if not, Application Processor 150 waits for the user to make a selection at step 258. In certain embodiments, such as where wireless device 100 includes a touch-screen display, the selectable response menu may be displayed as a list of selectable options on the display, each of which may be selected by the user by touching a portion of the display. In other embodiments, the user may select one of the selectable options by pressing a key on wireless device 100, or by any other suitable input means. In response to determining that the user has made a selection, at step 259, Application Processor 150 determines whether the user has selected a functional item. If a functional item is selected, Application Processor 150 may perform the associated function at step 160. In certain embodiments, such as where the functional item is a name, address, phone number, or e-mail address, the function may be to store this information in the wireless device (e.g., by creating or updating an entry in a contact list). In other embodiments, the function may be to search one or more databases stored on the wireless device, such as a contact list, for an entry matching the functional item.

For example, if the functional item is a name, Application Processor 150 may search the contact list to determine whether there is a entry corresponding to the name. In accordance with certain of these embodiments, Application Processor 150 may determine one or more response options based on the matching entry, such as an option to send a response message to an email address or phone number, or to initiate a voice call to a phone number that included in the matching entry. In other embodiments, such as where the functional item is a date and/or time, the function may be to create and store a reminder associated with the functional item. For example, Application Processor 150 may cause a calendar item to be created based on the functional item by using a standard interface to a calendar application included in wireless device 100. In certain embodiments, after performing the function associated with the selected functional item, Application Processor 150 may update, or create a new, selection list based on the performed function, cause the selection list to be displayed and return to step 257.

In response to determining that the user has selected a response option other than a functional item, at step 261, Application Processor 150 returns the selected user response action. In certain embodiments, Application Processor 150 may then cause a response message to be transmitted to the paging NOC based on the selected response message and/or response mechanism according to the process described in connection with FIG. 6. In accordance with certain of these embodiments, such as where the received message was transmitted to multiple recipients, the response message may include an attribute indicating that the response is to be transmitted to all of the recipients of the original message. In other embodiments, such as where the user has chosen to respond to a particular individual, Application Processor 150 may cause a response message to be transmitted to the individual directly.

In certain embodiments, such as where the user of the wireless device is unavailable, the user may setup an auto-response message. In certain embodiments, the user may input the auto-response at the wireless device and the wireless device may notify the paging NOC by transmitting a status message in accordance with the processes described in connection with FIG. 6. In other embodiments, the user may notify the paging NOC directly, such as through a separate device, or the auto-response may be created and/or inputted manually at the paging NOC. In accordance with certain of these embodiments, the paging NOC, in response to receiving a request to deliver a message to the user, may transmit back the auto-response to the requestor. The paging NOC may also determine another user, who is available, to which the requested message can be delivered. Similarly, in certain embodiments, such as where a message is delivered to multiple recipients, the paging NOC can monitor whether each of the recipients have received the message and track each recipient's response. This functionality increases the reliability and efficiency of the messaging system by allowing the paging NOC to keep track of the availability or schedules of certain users, notify senders when recipients are unavailable and/or maximize the chance that messages are delivered to users who are able to respond.

For example, an emergency situation may require a certain number of users to respond and go to a specified location. The paging NOC can transmit a corresponding message to a greater number of individuals and keep track of the number of individuals who are able to take the requested action based on their responses to the message. If the paging NOC determines that this number is less than the required number of individuals, a second message can be transmitted to the same, or another, group of individuals indicating the need for additional responders. If, however, the paging NOC determines that enough individuals are available, a message can be transmitted to the remaining individuals indicating that no further responders are necessary. This functionality further increases the reliability and efficiency of the messaging system by allowing the paging NOC to keep track of the availability of certain users, notify senders when recipients are unavailable and/or maximize the chance that messages are delivered to users who are able to respond. This functionality further increases the reliability and efficiency of the messaging system by allowing the paging NOC to minimize the delay associated with responding to emergencies and ensure that the appropriate number of users respond to the emergency.

It is understood that the various devices and methods described in connection with the foregoing figures are exemplary, and any other suitable devices or methods may be used. The foregoing is merely illustrative of the principles of this invention and various modifications can be made by those skilled in the art without departing from the scope and spirit of the invention. As an example, although certain embodiments of the wireless device have been described in connection with having two or three antennas associated with particular frequency ranges, the paging device could have any number of antennas associated with any one or more frequency ranges. One skilled in the art will appreciate that the present invention can be practiced in other than the described embodiments, which are presented for purposes of illustration and not limitation, and the present invention is limited only by the claims which follow.

What is claimed is:

1. A wireless device for communicating with a paging network operations center, the device comprising:
   an application processor;
   display circuitry coupled to the application processor;
   a cellular baseband processor coupled to the application processor;
   an RF transceiver coupled to the cellular baseband processor and adapted to establish a radio connection with a cellular network;
   a paging baseband processor coupled to the application processor;
   an RF receiver coupled to the paging baseband processor and adapted to establish a radio connection with a paging network and to receive a paging message from the paging network operations center through the established radio connection; and
   wherein, in response to receiving the paging message, the application processor is adapted to:
      transfer the message to the display circuitry for display; and
      cause a status message pertaining to the paging message to be transmitted to the paging network operations center through a cellular or Internet connection.

2. The wireless device according to claim 1, wherein a receiver portion of the RF transceiver includes the RF receiver.

3. The wireless device according to claim 1, wherein at least two of the application processor, the cellular baseband processor and the paging baseband processor are integrated within a single processor.

4. The wireless device according to claim 1, wherein the Internet connection is selected from the group consisting of a wireless network connection, a wired network connection, and a combination of a wireless network connection and a wired network connection.

5. The wireless device according to claim 1, wherein the status message includes an acknowledgement that the paging message has been received successfully.

6. The wireless device according to claim 1, wherein the status message includes a notification of an error in the receipt of the paging message.

7. The wireless device according to claim 6, wherein the wireless device is adapted to receive a retransmitted message including content that is substantially similar to the content of the paging message through the radio connection with the paging network in response to transmitting the status message to the paging network operations center.

8. The wireless device according to claim 1, wherein the application processor is adapted to:
   receive a notification that the paging message has been read; and
   cause the status message to be transmitted to the paging network operations center in response to receiving the notification, wherein the status message includes an acknowledgement that the paging message has been read.

9. The wireless device according to claim 1, wherein the application processor is adapted to determine whether the RF receiver has established a radio connection with the paging network.

10. The wireless device according to claim 9, wherein the application processor is adapted to cause a connection status message to be transmitted to the paging network operations center in response to determining that the radio connection has not been established, wherein the connection status message includes a notification that a radio connection cannot be established with the paging network.

11. The wireless device according to claim 10, wherein the wireless device is adapted to receive a retransmitted message through the cellular or Internet connection in response to transmitting the connection status message to the paging network operations center, wherein the retransmitted message includes content that is substantially similar to the content of the paging message.

12. The wireless device according to claim 9, wherein the application processor is adapted to cause a connection status message to be transmitted to the paging network operations center in response to determining that the radio connection has been established, wherein the second connection status message includes a notification that RF receiver has established a radio connection with the paging network.

13. A wireless device for communicating with a paging network operations center, the device comprising:
   an application processor;
   display circuitry coupled to the application processor;
   a cellular baseband processor coupled to the application processor;
   an RF transceiver coupled to the cellular baseband processor and adapted to establish a radio connection with a cellular network;
   a paging baseband processor coupled to the application processor;
   an RF receiver coupled to the paging baseband processor and adapted to:
      establish a radio connection with a paging network; and
      receive a paging message from the paging network operations center through the radio connection with the paging network, the paging message including a message priority attribute; and
   wherein, in response to receiving the paging message, the application processor is adapted to:
      transfer the paging message to the display circuitry; and
      cause the display circuitry to display the paging message based at least in part on the message priority attribute.

14. The wireless device according to claim 13, wherein the message priority attribute includes a priority level for the paging message.

15. The wireless device according to claim 13, wherein the message priority attribute includes a classification for the paging message.

16. The wireless device according to claim 13, wherein the application processor is adapted to:
   detect whether an application is executing on the wireless device;
   determine whether the execution of the application should be interrupted based at least in part on the message priority attribute; and
   cause, in response to determining that the execution of the application should be interrupted, the display circuitry to display the paging message.

17. The wireless device according to claim 16, wherein the message priority attribute includes a priority level and the application processor is adapted to determine whether the execution of the application should be interrupted by comparing the priority level to a threshold priority level.

18. The wireless device according to claim 16, wherein the message priority attribute includes a priority level, the wireless device includes a stored list of one or more application priority levels and the application processor is adapted to determine whether the execution of the application should be interrupted by:
   identifying an application priority level for the application from the stored list of one or more application priority levels; and
   comparing the priority level to the application priority level.

19. The wireless device according to claim 18, wherein the stored list of one or more application priority levels is customizable based on a user of the wireless device.

20. The wireless device according to claim 17, wherein in response to determining that the execution of the application should not be interrupted the application processor is adapted to:
   store the paging message in memory;
   store an attribute with the paging message that indicates that the paging message has not been displayed; and
   generate an alert that indicates the paging message has been received.

21. The wireless device according to claim 13, wherein the application processor is adapted to:
   determine a color scheme for the paging message based at least in part on the message priority attribute; and
   cause the display circuitry to display the message based on the color scheme.

22. The wireless device according to claim 21, wherein the message priority attribute indicates that the paging message pertains to a code blue event and the paging message is displayed with a blue color scheme.

23. The wireless device according to claim 21, application processor is adapted to determine a color scheme for the paging message based on a stored list of one or more message color schemes.

24. The wireless device according to claim 23, wherein the stored list of one or more message color schemes is customizable based on a user of the wireless device.

25. A wireless device for communicating with a paging network operations center, the device comprising:
   an application processor;
   display circuitry coupled to the application processor;
   a cellular baseband processor coupled to the application processor;
   an RF transceiver coupled to the cellular baseband processor and adapted to establish a radio connection with a cellular network;
   a paging baseband processor coupled to the application processor;
   an RF receiver coupled to the paging baseband processor and adapted to:
      establish a radio connection with a paging network; and
      receive a paging message from the paging network operations center through the radio connection with the paging network; and
   wherein, in response to receiving the paging message, the application processor is further adapted to:
      determine a plurality of user response actions based at least in part on the paging message; and
      cause the display circuitry to display a selectable response menu that includes one or more of the plurality of user response actions.

26. The wireless device according to claim 25, wherein the application processor is adapted to determine one or more of the plurality of user response actions by:
- identifying a searchable item from the paging message; and
- comparing the searchable item to data stored in a memory of the wireless device.

27. The wireless device according to claim 26, wherein the searchable item is selected from the group consisting of a name, a username, a phone number, an address, an email address, and a URL.

28. The wireless device according to claim 26 wherein the application processor is adapted to compare the searchable item to data stored in the memory by determining whether the searchable item matches an entry in a contact list stored in the memory.

29. The wireless device according to claim 28 wherein, in response to determining that the one or more searchable items matches an entry in the contact list, the application processor is adapted to:
- determine one or more response mechanisms from the matched entry; and
- generate one or more of the plurality of user response actions based on the one or more response mechanisms.

30. The wireless device according to claim 25, wherein the paging message includes one or more predefined responses and the application processor is adapted to determine one or more of the plurality of user response actions based on the one or more predefined responses.

31. The wireless device according to claim 25, wherein the paging message includes an attribute that indicates that the paging message was transmitted to one or more other recipients, and the selectable response menu includes an option to transmit a response to the sender of the paging message and the one or more other recipients.

32. The wireless device according to claim 25, wherein the wireless device includes a stored list of predetermined responses and the selectable response menu includes an option to transmit a response based on one or more of the predetermined responses.

33. The wireless device according to claim 25, wherein the selectable response menu includes an option to input a custom response.

34. The wireless device according to claim 25, wherein the application processor is adapted to:
- receive a notification that one of the plurality of user response actions has been selected; and
- cause a response message to be transmitted based on the selected user response action.

35. The wireless device according to claim 34, wherein the response message includes an attribute indicating that the response message should be delivered to one or more specified recipients.

36. The wireless device according to claim 34, wherein the response message is transmitted over a network selected from the group consisting of a cellular network and the Internet.

* * * * *